US009374975B2

(12) United States Patent
Hofman et al.

(10) Patent No.: US 9,374,975 B2
(45) Date of Patent: *Jun. 28, 2016

(54) SYSTEM AND METHOD OF ATTACHING CUPS TO A DAIRY ANIMAL

(71) Applicant: TECHNOLOGIES HOLDINGS CORP, Houston, TX (US)

(72) Inventors: Henk Hofman, Lemmer (NL); Cor de Ruijter, Staphorst (NL); Menno Koekoek, Dronten (NL); Peter Willem van der Sluis, Ijsselmuiden (NL)

(73) Assignee: Technologies Holdings Corp., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/921,350

(22) Filed: Oct. 23, 2015

(65) Prior Publication Data

US 2016/0044887 A1 Feb. 18, 2016

Related U.S. Application Data

(63) Continuation of application No. 14/184,206, filed on Feb. 19, 2014, which is a continuation of application No. 13/449,162, filed on Apr. 17, 2012, now Pat. No. 8,683,946, which is a continuation-in-part of application No. 13/095,983, filed on Apr. 28, 2011, now Pat. No. 9,107,378.

(51) Int. Cl.
*A01J 5/017* (2006.01)
*A01K 1/12* (2006.01)

(52) U.S. Cl.
CPC ................. *A01J 5/0175* (2013.01); *A01K 1/12* (2013.01); *Y10S 901/02* (2013.01)

(58) Field of Classification Search
CPC ........... A01J 5/0175; A01J 5/007; A01J 5/00; A01J 5/017; A01J 7/00; A01J 7/025; A01K 1/12
USPC ........... 119/14.02, 14.08, 14.01, 14.03, 14.18
See application file for complete search history.

(56) References Cited

U.S. PATENT DOCUMENTS

| 2,731,300 A | 1/1956 | Jansen ......................... 299/111 |
| 2,830,559 A | 4/1958 | McMurray .................... 119/159 |
| 3,174,457 A | 3/1965 | Lyttle et al. ....................... 119/1 |
| 3,835,814 A | 9/1974 | Jacobs et al. ................ 119/14.04 |

(Continued)

FOREIGN PATENT DOCUMENTS

| AT | 386 922 B | 11/1988 | ................ A01J 7/00 |
| AT | 387 686 B | 2/1989 | ................ A01J 5/01 |

(Continued)

OTHER PUBLICATIONS

Canadian Intellectual Property Office; Office Action for Application No. 2,775,177; 3 pages, Feb. 22, 2013.

(Continued)

*Primary Examiner* — Yvonne Abbott-Lewis
(74) *Attorney, Agent, or Firm* — Baker Botts L.L.P.

(57) ABSTRACT

A robotic attacher retrieves cups from the right side of an equipment area located behind a dairy livestock and attaches the cups to the teats of the dairy livestock in sequence. The sequence comprises attaching a first cup to the right front teat, a second cup to the left front teat, a third cup to the right rear teat, and a fourth cup to the left rear teat.

5 Claims, 26 Drawing Sheets

(56) References Cited

U.S. PATENT DOCUMENTS

| | | | |
|---|---|---|---|
| 4,306,454 A | 12/1981 | Olrik et al. | 73/224 |
| 4,508,058 A | 4/1985 | Jakobson et al. | 119/14.02 |
| 4,617,876 A | 10/1986 | Hayes | 119/155 |
| 4,726,322 A | 2/1988 | Torsius | 119/14.14 |
| 4,735,172 A | 4/1988 | Wahlström et al. | 119/14.1 |
| 4,819,875 A | 4/1989 | Beal | 239/97 |
| 4,867,103 A | 9/1989 | Montalescot et al. | 119/14.08 |
| 4,941,433 A | 7/1990 | Hanauer | 119/14.02 |
| 5,020,477 A | 6/1991 | Dessing et al. | 119/14.08 |
| 5,042,428 A | 8/1991 | Van der Lely | |
| 5,069,160 A | 12/1991 | Street et al. | 119/14.08 |
| 5,088,447 A | 2/1992 | Spencer et al. | 119/51.02 |
| 5,285,746 A | 2/1994 | Moreau | 119/14.03 |
| 5,379,721 A | 1/1995 | Dessing et al. | 119/14.08 |
| 5,479,876 A | 1/1996 | Street et al. | 119/14.08 |
| 5,553,569 A | 9/1996 | Street et al. | 119/525 |
| 5,596,945 A | 1/1997 | van der Lely | 119/14.03 |
| 5,666,903 A | 9/1997 | Bull et al. | 119/14.01 |
| 5,678,506 A | 10/1997 | van der Berg et al. | 119/14.18 |
| 5,718,185 A | 2/1998 | Pichler et al. | 119/14.04 |
| 5,722,343 A | 3/1998 | Aurik et al. | 119/14.02 |
| 5,784,994 A | 7/1998 | van der Lely | 119/14.08 |
| 5,816,190 A | 10/1998 | van der Lely | 119/14.08 |
| 5,862,776 A | 1/1999 | van den Berg | 119/14.1 |
| 5,918,566 A | 7/1999 | van den Berg | 119/14.02 |
| 5,934,220 A | 8/1999 | Hall et al. | 119/14.08 |
| 5,979,359 A | 11/1999 | Hansson | 119/14.08 |
| 6,050,219 A | 4/2000 | van der Lely | 119/14.08 |
| 6,055,930 A | 5/2000 | Stein et al. | 119/14.08 |
| 6,105,536 A | 8/2000 | DeWaard | 119/14.04 |
| 6,118,118 A | 9/2000 | van der Lely et al. | 250/221 |
| 6,167,839 B1 | 1/2001 | Isaksson et al. | 119/14.08 |
| 6,189,486 B1 | 2/2001 | Lindholm | 119/14.02 |
| 6,205,949 B1 | 3/2001 | van den Berg | 119/14.02 |
| 6,213,051 B1 | 4/2001 | Fransen | 119/14.08 |
| 6,227,142 B1 | 5/2001 | Birk | 119/14.08 |
| 6,234,109 B1 | 5/2001 | Andersson et al. | 119/14.08 |
| 6,257,169 B1 | 7/2001 | Oosterling | 119/14.02 |
| 6,321,682 B1 | 11/2001 | Eriksson et al. | 119/14.44 |
| 6,323,942 B1 | 11/2001 | Bamji | 356/5.01 |
| 6,341,575 B1 | 1/2002 | Forsén | 119/14.08 |
| 6,363,883 B1 | 4/2002 | Birk | 119/14.08 |
| 6,401,654 B1 | 6/2002 | Hallsten et al. | 119/14.18 |
| 6,443,094 B1 | 9/2002 | DeWaard | 119/14.18 |
| 6,532,892 B1 * | 3/2003 | Nilsson | A01J 5/0175 119/14.03 |
| 6,543,381 B1 | 4/2003 | Birk et al. | 119/14.08 |
| 6,553,942 B1 | 4/2003 | Eriksson | 119/670 |
| 6,568,352 B2 | 5/2003 | Fransen | 119/668 |
| 6,591,784 B1 | 7/2003 | Eriksson | 119/670 |
| 6,626,130 B1 | 9/2003 | Eriksson | 119/670 |
| 6,729,262 B2 | 5/2004 | Ealy et al. | 119/14.08 |
| 6,864,914 B1 | 3/2005 | Birk | 348/211.99 |
| 6,974,373 B2 | 12/2005 | Kriesel | 452/157 |
| 6,976,644 B2 | 12/2005 | Troudt | 239/587.1 |
| 7,039,220 B2 | 5/2006 | Kriesel | 382/110 |
| 7,128,020 B2 | 10/2006 | Björk et al. | 119/14.18 |
| 7,146,928 B2 | 12/2006 | Ealy et al. | 119/14.08 |
| 7,246,571 B2 | 7/2007 | Van Den Berg et al. | 119/14.08 |
| 7,299,766 B2 | 11/2007 | Van Den Berg et al. | 119/14.02 |
| 7,377,232 B2 | 5/2008 | Holmgren et al. | 119/670 |
| 7,690,327 B2 | 4/2010 | Van Den Berg | 119/14.02 |
| 7,882,802 B2 | 2/2011 | Van Den Berg et al. | 119/14.08 |
| 8,036,429 B2 | 10/2011 | Doyle, II | 382/110 |
| 8,074,600 B2 | 12/2011 | Källén et al. | 119/14.04 |
| 8,210,122 B2 | 7/2012 | Pettersson et al. | 119/14.08 |
| 2001/0024514 A1 | 9/2001 | Matsunaga | 382/106 |
| 2002/0108576 A1 | 8/2002 | Lely et al. | 119/14.02 |
| 2003/0097990 A1 | 5/2003 | Bjork et al. | 119/14.08 |
| 2004/0103846 A1 | 6/2004 | Fransen | 119/14.03 |
| 2005/0223997 A1 | 10/2005 | Umegard | 119/14.03 |
| 2006/0196431 A1 | 9/2006 | Kaever et al. | 119/14.04 |
| 2007/0137579 A1 | 6/2007 | Osthues et al. | 119/14.03 |
| 2007/0245964 A1 | 10/2007 | Van Den Berg et al. | 119/14.08 |
| 2007/0277737 A1 | 12/2007 | Maier et al. | 119/14.45 |
| 2008/0202432 A1 | 8/2008 | Petterson | 119/14.03 |
| 2010/0031889 A1 | 2/2010 | Eriksson et al. | 119/14.02 |
| 2010/0095893 A1 | 4/2010 | Kallen et al. | 119/14.04 |
| 2010/0186675 A1 | 7/2010 | Van Den Berg | 119/14.03 |
| 2010/0282172 A1 | 11/2010 | Eriksson et al. | 119/14.02 |
| 2010/0289649 A1 | 11/2010 | Holmgren et al. | 340/573.3 |
| 2011/0114024 A1 | 5/2011 | Van Den Berg | 119/14.02 |
| 2011/0239945 A1 | 10/2011 | Van Den Berg | 119/14.02 |
| 2012/0000427 A1 | 1/2012 | Nilsson | 119/14.02 |
| 2012/0006269 A1 | 1/2012 | McCain et al. | 119/14.02 |
| 2012/0048207 A1 | 3/2012 | Hofman et al. | 119/651 |
| 2012/0048208 A1 | 3/2012 | Hofman et al. | 119/651 |
| 2012/0180729 A1 | 7/2012 | Van Dorp | 119/14.08 |

FOREIGN PATENT DOCUMENTS

| | | | | |
|---|---|---|---|---|
| AT | 404 537 B | 12/1998 | | A01J 7/04 |
| AT | 406 108 B | 2/2000 | | A01J 5/00 |
| AU | 2005222545 A1 | 11/2005 | | A01J 5/017 |
| CA | 1 253 956 | 5/1989 | | A01J 7/00 |
| CA | 2 313 533 A1 | 6/1999 | | G06T 1/00 |
| CA | 2 315 018 A1 | 7/1999 | | G06T 1/00 |
| DE | 37 42 867 A1 | 7/1989 | | A01J 5/017 |
| DE | 39 38 077 A1 | 5/1991 | | A01J 5/017 |
| DE | 689 19 414 T3 | 5/1995 | | A01J 5/017 |
| DE | 691 16 926 T2 | 11/1996 | | A01J 5/017 |
| DE | 196 36 551 A1 | 3/1998 | | A01J 5/017 |
| DE | 689 28 489 T2 | 4/1998 | | A01J 5/00 |
| DE | 38 75 414 T3 | 8/1999 | | A01J 5/00 |
| DE | 691 32 321 T2 | 2/2001 | | A01J 5/017 |
| DE | 102 12 676 C1 | 3/2002 | | A01K 1/12 |
| DK | 144542 B | 5/1980 | | A01J 7/00 |
| DK | 147721 B | 7/1981 | | A01J 5/04 |
| DK | 218482 A | 11/1983 | | A01J 5/10 |
| DK | 328482 A | 1/1984 | | A01J 7/00 |
| DK | 169247 B1 | 9/1994 | | A01J 5/00 |
| DK | 173139 B1 | 6/1998 | | A01J 5/04 |
| EP | 0 188 303 A1 | 7/1986 | | A01J 7/00 |
| EP | 0 209 202 A1 | 1/1987 | | A01J 7/00 |
| EP | 0 229 682 A1 | 7/1987 | | A01J 7/00 |
| EP | 0 232 568 A1 | 8/1987 | | G01S 15/88 |
| EP | 0 119 222 B1 | 4/1988 | | A01J 5/04 |
| EP | 0 300 582 A1 | 1/1989 | | A01J 7/00 |
| EP | 0 306 579 A1 | 3/1989 | | A01J 5/017 |
| EP | 0 309 036 A1 | 3/1989 | | A01J 7/00 |
| EP | 0 327 037 A2 | 8/1989 | | A01M 7/00 |
| EP | 0 329 248 A1 | 8/1989 | | A01J 7/00 |
| EP | 0 349 019 A2 | 1/1990 | | A01J 5/08 |
| EP | 0 360 354 A1 | 3/1990 | | A01J 7/00 |
| EP | 0 432 148 A2 | 6/1991 | | A01K 1/12 |
| EP | 0 440 313 A2 | 8/1991 | | G01S 15/42 |
| EP | 0 448 132 A2 | 9/1991 | | A01J 7/00 |
| EP | 0 455 305 A1 | 11/1991 | | G01S 7/48 |
| EP | 0 467 489 A1 | 1/1992 | | A01J 7/00 |
| EP | 0 472 247 A2 | 2/1992 | | A01J 7/00 |
| EP | 0 479 397 A2 | 4/1992 | | A01J 7/00 |
| EP | 0 511 722 A2 | 11/1992 | | A01D 7/00 |
| EP | 0 511 723 A2 | 11/1992 | | A01D 7/00 |
| EP | 0 516 246 A2 | 12/1992 | | A01D 7/00 |
| EP | 0 541 517 A2 | 5/1993 | | A01J 7/00 |
| EP | 0 545 916 A2 | 6/1993 | | A01J 7/00 |
| EP | 0 548 058 A2 | 6/1993 | | A01K 1/12 |
| EP | 0 553 940 A2 | 8/1993 | | A01J 7/00 |
| EP | 0 565 189 A2 | 10/1993 | | A01J 7/00 |
| EP | 0 574 089 A2 | 12/1993 | | G01S 7/48 |
| EP | 0 630 558 A2 | 12/1994 | | A01J 7/00 |
| EP | 0 634 097 A1 | 1/1995 | | A01K 1/12 |
| EP | 0 643 907 A2 | 3/1995 | | A01J 7/00 |
| EP | 0 688 498 A2 | 12/1995 | | A01J 7/00 |
| EP | 0 689 762 A1 | 1/1996 | | A01K 1/12 |
| EP | 0 779 025 A2 | 6/1997 | | A01J 5/017 |
| EP | 0 789 995 A1 | 8/1997 | | A01J 7/04 |
| EP | 0 824 857 A1 | 2/1998 | | A01J 5/017 |
| EP | 0 880 889 A2 | 12/1998 | | A01J 5/017 |
| EP | 0 900 522 A1 | 3/1999 | | A01J 5/017 |
| EP | 0 951 651 B1 | 10/1999 | | G01S 17/00 |
| EP | 1 089 614 B1 | 4/2001 | | A01J 7/02 |
| EP | 1 211 928 B1 | 6/2002 | | A01J 5/017 |
| EP | 1 253 440 A1 | 10/2002 | | G01S 7/481 |

(56) References Cited

FOREIGN PATENT DOCUMENTS

| | | | |
|---|---|---|---|
| EP | 1 316 253 A2 | 11/2002 | ............... A01K 1/12 |
| EP | 1 279 327 A2 | 1/2003 | ............... A01J 5/017 |
| EP | 1 388 281 A1 | 2/2004 | ............... A01J 7/02 |
| EP | 1 447 002 A1 | 8/2004 | ............... A01J 5/017 |
| EP | 1 460 453 A1 | 9/2004 | ............... G01S 17/89 |
| EP | 1 520 468 A1 | 4/2005 | ............... A01J 7/04 |
| EP | 1 537 774 A1 | 6/2005 | ............... A01J 5/017 |
| EP | 1 537 775 A1 | 6/2005 | ............... A01J 5/017 |
| EP | 1 523 882 A2 | 3/2009 | ............... A01K 1/12 |
| ES | 2 064 892 T3 | 2/1995 | ............... A01J 5/017 |
| FI | 88099 B | 12/1992 | ............... A01J 7/00 |
| FI | 20002169 A | 4/2002 | ............... A01J 5/01 |
| FR | 2 595 197 A1 | 9/1987 | ............... A01J 5/017 |
| GB | 2 184 233 A | 6/1987 | ............... G01N 21/89 |
| GB | 2 218 888 A | 11/1989 | ............... A01J 7/00 |
| JP | 62-159078 A | 7/1987 | ............... A01J 5/00 |
| JP | 9-196631 A | 7/1997 | ............... G01B 11/00 |
| JP | 9-243315 A | 9/1997 | ............... A01J 5/00 |
| JP | 9-275834 A | 10/1997 | ............... A01J 5/00 |
| JP | 9-285234 A | 11/1997 | ............... A01J 5/00 |
| JP | 11-276002 A | 10/1999 | ............... A01J 5/00 |
| JP | 11-281340 A | 10/1999 | ............... A01J 5/00 |
| JP | 2001-504944 A | 4/2001 | ............... A01J 5/00 |
| JP | 2002-521007 A | 7/2002 | ............... A01J 5/00 |
| JP | 2002-253075 A | 9/2002 | ............... A01J 5/00 |
| NL | 8502039 A | 2/1987 | ............... A01J 5/017 |
| NL | 8503580 A | 7/1987 | ............... A01J 5/00 |
| NL | 8600076 A | 8/1987 | ............... A01J 5/00 |
| NL | 8602699 A | 5/1988 | ............... A01J 5/017 |
| NL | 8800042 A | 8/1989 | ............... A01J 5/017 |
| NL | 8801785 A | 2/1990 | ............... A01J 5/017 |
| NL | 9101088 A | 1/1993 | ............... A01J 7/00 |
| NL | 9201434 A | 3/1994 | ............... A01J 5/017 |
| NL | 9201902 A | 6/1994 | ............... A01J 5/017 |
| NL | 9400220 A | 9/1995 | ............... A01J 5/017 |
| NL | 9400471 A | 11/1995 | ............... A01J 5/017 |
| NL | 9500276 A | 9/1996 | ............... A01J 5/017 |
| NL | 9500277 A | 9/1996 | ............... A01J 5/017 |
| NL | 9500363 A | 10/1996 | ............... A01J 5/017 |
| NL | 9500566 A | 11/1996 | ............... A01J 5/01 |
| NL | 1 009 632 C2 | 7/1998 | ............... A01J 5/017 |
| NL | 1006804 C2 | 2/1999 | ............... A01J 5/00 |
| NL | 1009711 C2 | 1/2000 | ............... A01J 5/00 |
| NL | 1013026 C2 | 3/2001 | ............... A01J 5/017 |
| NL | 1018563 C1 | 1/2003 | ............... A01J 5/017 |
| SE | 419 901 B | 8/1981 | ............... A01J 7/00 |
| SE | 425 821 B | 11/1982 | ............... A01J 7/00 |
| SE | 433 553 B | 6/1984 | ............... A01J 5/10 |
| SE | 512 334 C2 | 2/2000 | ............... A01J 5/017 |
| WO | WO 96/20587 A1 | 7/1996 | ............... A01J 5/017 |
| WO | WO 97/15183 A1 | 5/1997 | ............... A01J 5/017 |
| WO | WO 97/15901 A1 | 5/1997 | ............... G06T 7/00 |
| WO | WO 97/37528 A1 | 10/1997 | ............... A01J 5/017 |
| WO | WO 98/01022 A1 | 1/1998 | ............... A01J 5/017 |
| WO | WO 98/35547 A1 | 8/1998 | ............... A01J 5/017 |
| WO | WO 98/44782 A1 | 10/1998 | ............... A01J 5/017 |
| WO | WO 98/45808 A1 | 10/1998 | ............... G06T 1/00 |
| WO | WO 98/47348 A1 | 10/1998 | ............... A01J 5/017 |
| WO | WO 99/09430 A2 | 2/1999 | ............... G01S 17/00 |
| WO | WO 99/30277 A1 | 6/1999 | ............... G06T 1/00 |
| WO | WO 99/33020 A1 | 7/1999 | ............... G06T 1/00 |
| WO | WO 00/04763 A1 | 2/2000 | ............... A01J 5/017 |
| WO | WO 00/04765 A1 | 2/2000 | ............... A01J 5/017 |
| WO | WO 00/11935 A1 | 3/2000 | ............... A01J 5/017 |
| WO | WO 00/11936 A1 | 3/2000 | ............... A01J 5/017 |
| WO | WO 00/11940 A1 | 3/2000 | ............... A01K 11/00 |
| WO | WO 00/62602 A1 | 10/2000 | ............... A01J 5/017 |
| WO | WO 01/19171 A1 | 3/2001 | ............... A01J 5/017 |
| WO | WO 01/19172 A1 | 3/2001 | ............... A01J 5/017 |
| WO | WO 01/52633 A1 | 7/2001 | ............... A01J 5/017 |
| WO | WO 02/00011 A1 | 1/2002 | ............... A01J 5/017 |
| WO | WO 02/07098 A1 | 1/2002 | ............... G06T 7/00 |
| WO | WO 02/15676 A1 | 2/2002 | ............... A01J 5/017 |
| WO | WO 02/082201 A1 | 10/2002 | ............... G05D 1/02 |
| WO | WO 03/055297 A1 | 7/2003 | ............... A01J 5/017 |
| WO | WO 2005/015985 A2 | 2/2005 | |
| WO | WO 2006/038840 A1 | 4/2006 | ............... A01K 1/12 |
| WO | WO 2007/050012 A1 | 5/2007 | ............... A01J 5/017 |
| WO | WO 2008/030116 A1 | 3/2008 | ............... A01K 1/12 |
| WO | WO 2008/058723 A1 | 5/2008 | ............... A01J 7/02 |
| WO | WO 2008/118068 A1 | 10/2008 | ............... A01K 1/12 |
| WO | WO 2009/093965 A1 | 7/2009 | ............... A01J 5/017 |
| WO | WO 2010/012625 A2 | 2/2010 | ............... A01J 5/017 |
| WO | WO 2010/014002 A9 | 2/2010 | ............... A01K 1/12 |
| WO | WO 2010/046669 A1 | 4/2010 | ............... A01J 5/017 |
| WO | WO 2010/110663 A1 | 9/2010 | ............... A01J 5/017 |
| WO | WO 2010/119079 A2 | 10/2010 | ............... A01K 1/12 |
| WO | WO 2011/098454 A1 | 8/2011 | ............... A01K 1/12 |
| WO | WO 2011/098994 A2 | 8/2011 | ............... A01J 5/017 |
| WO | WO 2011/102717 A1 | 8/2011 | ............... A01K 1/12 |
| WO | WO 2011/117386 A2 | 9/2011 | ............... A01J 5/00 |

OTHER PUBLICATIONS

Canadian Intellectual Property Office; Office Action for Application No. 2,775,130; 4 pages, Nov. 27, 2012.
Canadian Intellectual Property Office; Office Action for Application No. 2,775,177; 3 pages, Nov. 27, 2012.
Canadian Intellectual Property Office; Office Action for Application No. 2,783,887; 2 pages, Oct. 1, 2012.
Canadian Intellectual Property Office; Office Action for Application No. 2,784,070; 3 pages, Oct. 1, 2012.
PCT Notification of Transmittal of the International Search Report and the Written Opinion of the International Searching Authority for International Application No. PCT/US2012/035107; 28 pages, Oct. 16, 2012.
Canadian Intellectual Property Office; Office Action for Application No. 2,775,130; 2 pages, Aug. 20, 2012.
Canadian Intellectual Property Office; Office Action for Application No. 2,775,169; 3 pages, Aug. 20, 2012.
Canadian Intellectual Property Office; Office Action for Application No. 2,775,252; 3 pages, Aug. 21, 2012.
Canadian Intellectual Property Office; Office Action for Application No. 2,775,177; 2 pages, Aug. 20, 2012.
U.S. Appl. No. 13/095,983, filed Apr. 28, 2011, Henk Hofman.
U.S. Appl. No. 13/095,994, filed Apr. 28, 2011, Henk Hofman.
U.S. Appl. No. 13/448,751, filed Apr. 17, 2012, Henk Hofman.
U.S. Appl. No. 13/448,799, filed Apr. 17, 2012, Henk Hofman.
U.S. Appl. No. 13/448,840, filed Apr. 17, 2012, Henk Hofman.
U.S. Appl. No. 13/448,873, filed Apr. 17, 2012, Henk Hofman.
U.S. Appl. No. 13/448,882, filed Apr. 17, 2012, Henk Hofman.
U.S. Appl. No. 13/448,897, filed Apr. 17, 2012, Henk Hofman.
U.S. Appl. No. 13/448,913, filed Apr. 17, 2012, Henk Hofman.
U.S. Appl. No. 13/448,929, filed Apr. 17, 2012, Henk Hofman.
U.S. Appl. No. 13/448,951, filed Apr. 17, 2012, Henk Hofman.
U.S. Appl. No. 13/448,993, filed Apr. 17, 2012, Henk Hofman.
U.S. Appl. No. 13/449,002, filed Apr. 17, 2012, Henk Hofman.
U.S. Appl. No. 13/449,056, filed Apr. 17, 2012, Henk Hofman.
U.S. Appl. No. 13/449,105, filed Apr. 17, 2012, Henk Hofman.
U.S. Appl. No. 13/449,142, filed Apr. 17, 2012, Henk Hofman.
U.S. Appl. No. 13/449,173, filed Apr. 17, 2012, Henk Hofman.
U.S. Appl. No. 13/449,951, filed Apr. 18, 2012, Henk Hofman.
U.S. Appl. No. 13/451,248, filed Apr. 19, 2012, Henk Hofman.
U.S. Appl. No. 13/454,281, filed Apr. 24, 2012, Henk Hofman.
U.S. Appl. No. 13/454,298, filed Apr. 24, 2012, Henk Hofman.
U.S. Appl. No. 13/454,351, filed Apr. 24, 2012, Henk Hofman.
U.S. Appl. No. 13/454,386, filed Apr. 24, 2012, Henk Hofman.
U.S. Appl. No. 13/454,490, filed Apr. 24, 2012, Henk Hofman.
U.S. Appl. No. 13/454,670, filed Apr. 24, 2012, Henk Hofman.
U.S. Appl. No. 13/454,716, filed Apr. 24, 2012, Henk Hofman.
U.S. Appl. No. 13/454,833, filed Apr. 24, 2012, Henk Hofman.
U.S. Appl. No. 13/454,876, filed Apr. 24, 2012, Henk Hofman.
U.S. Appl. No. 13/454,913, filed Apr. 24, 2012, Henk Hofman.
U.S. Appl. No. 13/454,953, filed Apr. 24, 2012, Henk Hofman.
U.S. Appl. No. 13/454,975, filed Apr. 24, 2012, Henk Hofman.
Jan W. Weingarten, et al.; *A State-of-the-Art 3D Sensor for Robot Navigation*; 6 pages, Sep. 2004.

(56) References Cited

OTHER PUBLICATIONS

PCT International Patent Application No. PCT/NL2010/050154 entitled *Robot and Method for Milking a Cow by this Robot*; 19 pages, Mar. 25, 2010.
PCT Notification of Transmittal of the International Search Report and the Written Opinion of the International Searching Authority for Application No. PCT/US2011/047510; 9 pages, Jan. 2, 2012.
PCT Notification of Transmittal of the International Search Report and the Written Opinion of the International Searching Authority for Application No. PCT/US2011/047511; 9 pages, Jan. 2, 2012.
PCT Invitation to Pay Additional Fees and, Where Applicable, Protest Fee and Partial National Search Report for Application No. PCT/US2012/035074; 7 pages, Jul. 16, 2012.
PCT Notification of Transmittal of the International Search Report and the Written Opinion of the International Searching Authority for Application No. PCT/US2012/033894; 11 pages, Jul. 23, 2012.
PCT Invitation to Pay Additional Fees and, Where Applicable, Protest Fee and Partial National Search Report for Application No. PCT/US2012/035077; 7 pages, Jul. 25, 2012.
PCT Invitation to Pay Additional Fees and, Where Applicable, Protest Fee and Partial National Search Report for Application No. PCT/US2012/035079; 8 pages, Jul. 31, 2012.
PCT Notification of Transmittal of the International Search Report and the Written Opinion of the International Searching Authority for Application No. PCT/US2012/033892; 13 pages, Jul. 31, 2012.
PCT Notification of Transmittal of the International Search Report and the Written Opinion of the International Searching Authority for .Application No. PCT/US2012/035356; 14 pages, Jul. 31, 2012.
PCT Invitation to Pay Additional Fees and, Where Applicable, Protest Fee and Partial National Search Report for Application No. PCT/US2012/035107; 7 pages, Jul. 31, 2012.
Canadian Intellectual Property Office; Office Action for Application No. 2,775,132; 3 pages, Aug. 20, 2012.
Canadian Office Action; Application No. 2,913,434; 4 pages, Dated Jan. 11, 2016.

* cited by examiner

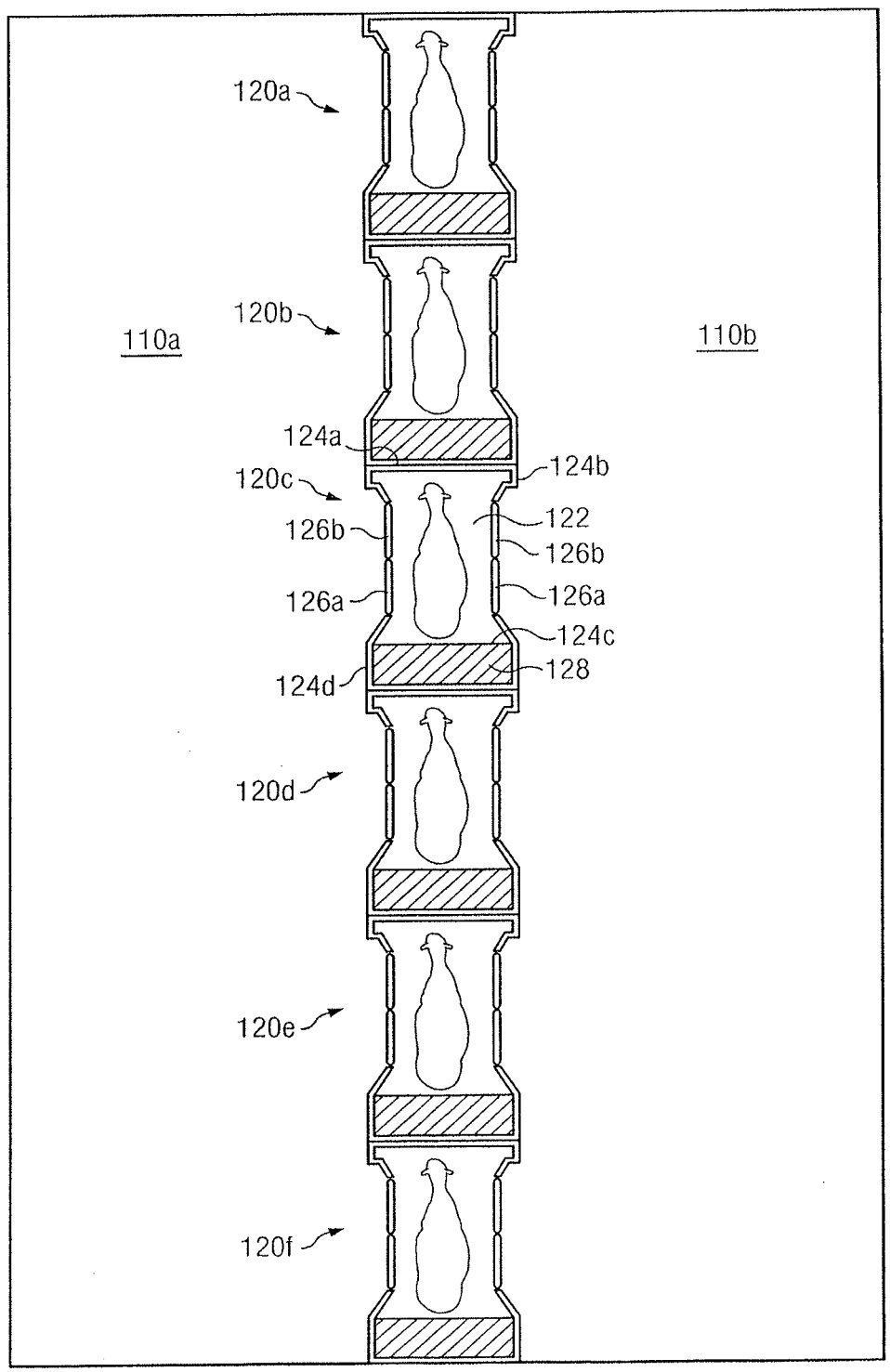

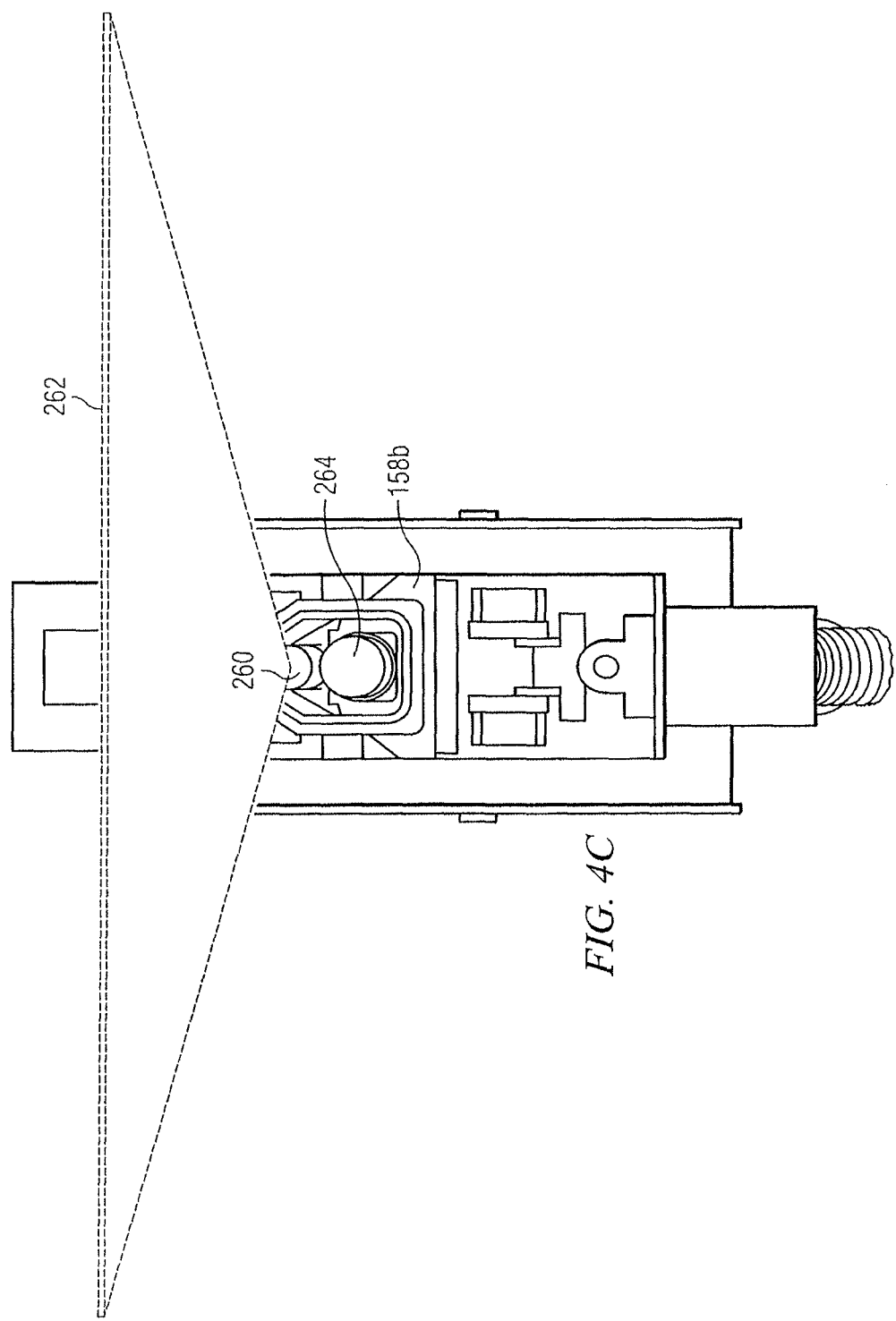

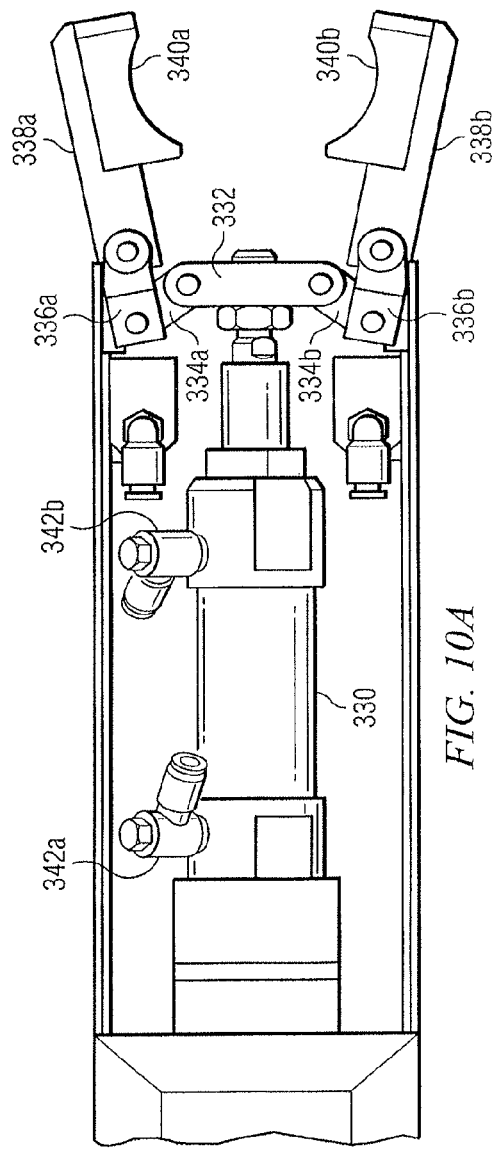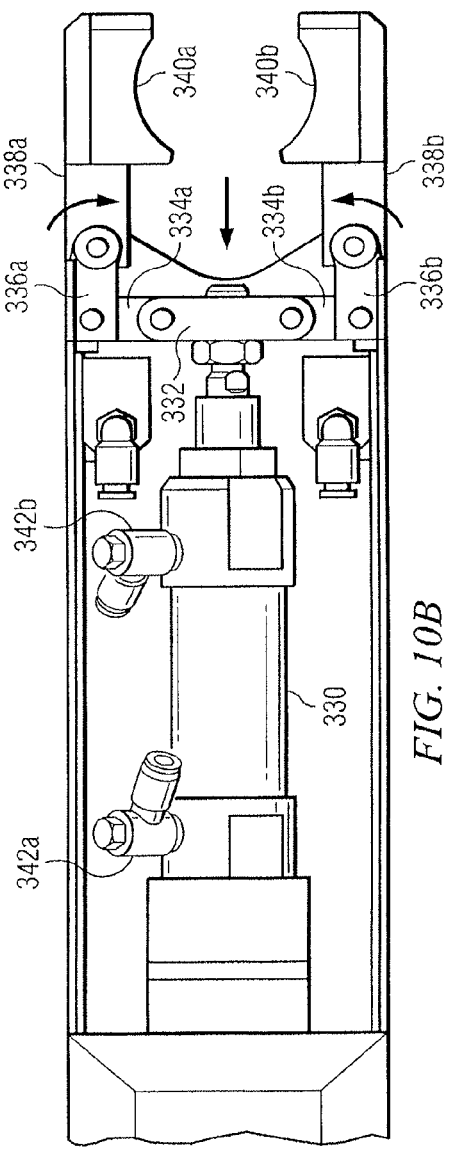
FIG. 10A
FIG. 10B

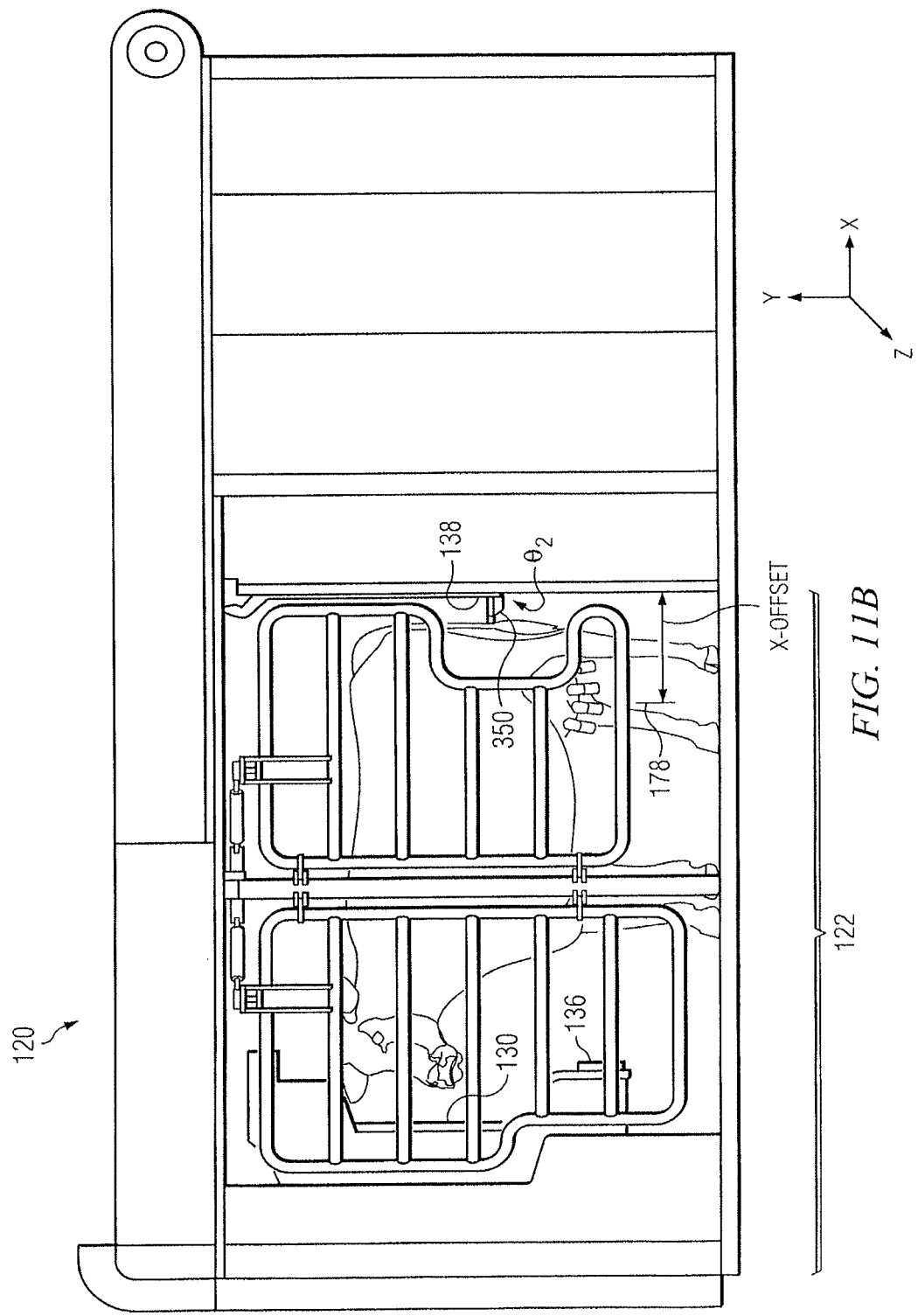

SYSTEM AND METHOD OF ATTACHING CUPS TO A DAIRY ANIMAL

RELATED APPLICATION

This application is a continuation of U.S. Ser. No. 14/184,206, filed Feb. 19, 2014 which is a continuation of U.S. Ser. No. 13/449,162, filed Apr. 17, 2012 entitled "System and Method of Attaching Cups to a Dairy Animal", which is now U.S. Pat. No. 8,683,946 issued Apr. 1, 2014, which is a continuation-in-part application of pending U.S. patent application Ser. No. 13/095,983 entitled "Milking Box with Robotic Attacher", filed Apr. 28, 2011, which is now U.S. Pat. No. 9,107,378 issued Aug. 18, 2015.

TECHNICAL FIELD

This invention relates generally to dairy farming and more particularly to attaching cups to a dairy animal.

BACKGROUND

Over time, the size and complexity of dairy milking operations has increased. Accordingly, the need for efficient and scalable systems and methods that support dairy milking operations has also increased. Systems and methods supporting dairy milking operations, however, have proven inadequate in various respects.

SUMMARY

According to embodiments of the present disclosure, disadvantages and problems associated with previous systems supporting dairy milking operations may be reduced or eliminated.

In certain embodiments, a robotic attacher retrieves cups from the right side of an equipment area located behind a dairy livestock and attaches the cups to the teats of the dairy livestock in sequence. The sequence comprises attaching a first cup to the right front teat, a second cup to the left front teat, a third cup to the right rear teat, and a fourth cup to the left rear teat. In certain alternative embodiments, the robotic attacher retrieves cups from the left side of the equipment area, and the sequence comprises attaching a first cup to the left front teat, a second cup to the right front teat, a third cup to the left rear teat, and a fourth cup to the right rear teat.

Particular embodiments of the present disclosure may provide one or more technical advantages. For example, in certain embodiments, the system of the present disclosure includes a robotic attacher positioned to the rear of a milking box rather than to the side of the milking box, as in certain conventional systems. The robotic attacher being positioned to the rear of a milking box may allow two milking boxes to be positioned side-by-side such that the same robotic attacher may attach milking equipment to dairy cows located in each of the milking boxes. Additionally, the robotic attacher being positioned to the rear of a milking box may allow for gates to be positioned on each side of the milking box in order to increase cow sorting capabilities. In certain embodiments, a robotic attacher may attach one or more cups to the teats of a dairy livestock according to a pre-determined sequence. The sequence may allow the robotic attacher positioned to the rear of the milking box to efficiently locate the teats of the dairy cow. In certain embodiments, the sequence may minimize the likelihood of the robotic attacher colliding into previously attached milking equipment and, thus, may minimize the likelihood of the robotic attacher accidentally detaching the milking equipment.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIGS. 1A-1B illustrate example configurations of an enclosure 100 in which one or more milking boxes are installed, according to certain embodiments of the present disclosure;

FIG. 4C illustrates an example of a front plan view of a camera coupled to the robotic attacher depicted in FIG. 3, according to certain embodiments of the present disclosure;

FIGS. 10A-10B illustrate an example of a gripping system for facilitating gripping movements by the robotic attacher depicted in FIG. 3, according to certain embodiments of the present disclosure;

FIGS. 11A-11D illustrate examples of the feed bowl and backplane of the milking box depicted in FIG. 3, according to certain embodiments of the present disclosure;

DETAILED DESCRIPTION

Figure 1B:
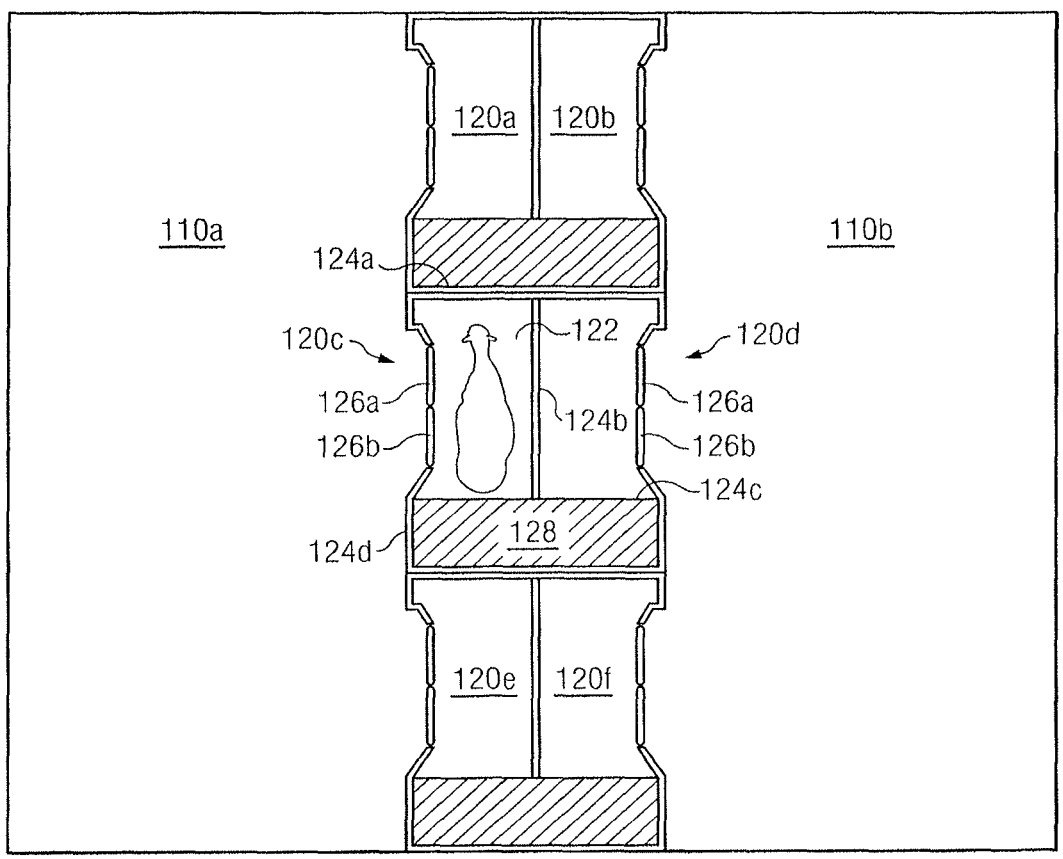

FIGS. 1A-1B illustrate example configurations of an enclosure 100 in which one or more milking boxes 120 are installed, according to certain embodiments of the present disclosure. Enclosure 100 may be divided into a number of regions 110 (e.g., regions 110a and 110b), and each region 110 may include resting stalls, feeding troughs, walking paths, and/or other structure suitable for housing dairy livestock. Although the present disclosure contemplates enclosure 100 as housing any suitable dairy livestock (e.g., dairy cows, goats, sheep, water buffalo, etc.), the remainder of this description is detailed with respect to dairy cows.

Each milking box 120 may include a stall portion 122 configured to house a dairy cow being milked. The stall portion 122 of each milking box 120 may be defined by a number of walls 124, each of which may each be constructed from any suitable materials arranged in any suitable configuration operable to maintain a dairy cow within stall portion 122 during milking. In certain embodiments, stall portion 122 of milking box 120 may include walls 124a, 124b, 124c, and 124d. For purposes of illustration, wall 124a may be designated as the front of milking box 120 such that the head of a dairy cow being milked would be facing wall 124a. Wall 124c may be positioned opposite wall 124a and may be designated as the rear of milking box 120. Walls 124b and 124d may each form a side extending between the front and rear of milking box 120. Walls 124a, 124b, 124c, and 124d may be spaced apart a suitable distance to ensure the comfort of the dairy cow within stall portion 122.

Figure 2:
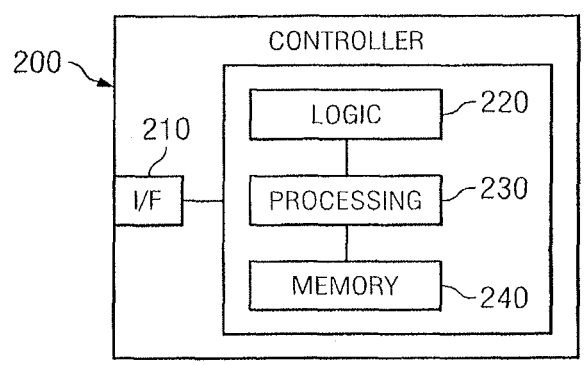
FIG. 2 illustrates an example controller that may be used to control one or more components of the example milking box depicted in FIG. 1, according to certain embodiments of the present disclosure.

Walls 124b and/or 124d may comprise one or more gates 126. In certain embodiments, wall 124b and/or wall 124d may comprise an entry gate 126a and an exit gate 126b. A dairy cow may enter milking box 120 through an opened entry gate 126a and exit milking box 120 through an opened exit gate 126b. Closing gates 126 may maintain the dairy cow within milking box 120 during milking, while opening one or more gates 126 may allow the dairy cow to exit milking box 120. In certain embodiments, gates 126 may each be coupled to a corresponding actuator such that the gates 126 may be automatically opened and/or closed. For example, the actuators corresponding to gates 126 may each be configured to communicate (e.g., via wireless or wireline communication) with a controller 200, depicted in detail in FIG. 2.

Controller 200 may include one or more computer systems at one or more locations. Examples of computer systems may include a personal computer, workstation, network computer, kiosk, wireless data port, personal data assistant (PDA), one or more processors within these or other devices, or any other suitable device for receiving, processing, storing, and communicating data. In short, controller 200 may include any suitable combination of software, firmware, and hardware. Controller 200 may include any appropriate interface 210 for receiving inputs and providing outputs, logic 220, one or more processing modules 230, and memory module 240. Logic 220 includes any information, logic, applications, rules, and/or instructions stored and/or executed by controller 200. Processing modules 230 may each include one or more microprocessors, controllers, or any other suitable computing devices or resources and may work, either alone or with other components, to provide a portion or all of the functionality described herein. Controller 200 may additionally include (or be communicatively coupled to via wireless or wireline communication) one or more memory modules 240. Memory modules 240 may be non-transitory and may each include any memory or database module. Memory modules 240 may take the form of volatile or non-volatile memory, including, without limitation, magnetic media, optical media, random access memory (RAM), read-only memory (ROM), removable media, or any other suitable local or remote memory component.

Returning to FIG. 1, controller 200 may be operable to determine, using any appropriate logic in conjunction with signals received from other components of milking box 120 (e.g., presence sensor 132, gate sensors 134, and/or identification sensor 136, each of which is described with regard to FIG. 3, below), which gates 126 should be open and/or closed. Controller 200 may then communicate signals to the actuators coupled to the determined gates 126, the signals causing the gates 126 to open or close. The automated control of gates 126 using controller 200 is described in further with regard to FIG. 3, below Each milking box 120 may additionally include an equipment portion 128 located to the rear of stall portion 122 (i.e., adjacent to rear wall 124c of stall portion 122). Equipment portion 128 may comprise any structure suitable for housing and/or storing a robotic attacher (e.g., robotic attacher 150, described below with regard to FIG. 3), one or more preparation cups, teat cups, receiver jars, separation containers, and/or any other suitable milking equipment. Rear wall 124c (which may include a backplane 138, as described below with regard to FIG. 3) may separate stall portion 122 from equipment portion 128 such that equipment portion 128 is substantially inaccessible to a dairy cow located in stall portion 122. Accordingly a dairy cow located in stall portion 122 may be prevented from accidentally damaging the milking equipment by kicking, biting, trampling, or exposing the milking equipment to dirt, fluids, etc.

In certain embodiments, the equipment portion 128 being located to the rear of stall portion 122 may allow milking boxes 120 to be aligned in a single row such that walls 124b and 124d of each milking box 120 may comprise an entry gate 126a and an exit gate 126b (as illustrated in FIG. 1A). As a result, milking boxes 120 may be used to sort dairy cows into particular regions 110 by controlling the opening/closing of each gate 126 (e.g., in response to signals from a controller 200, as described above). For example, a dairy cow needing a health check or medical attention my be sorted into an appropriate region 110 (e.g., a veterinary pen). As another example, a dairy cow determined to be finished milking for the year and needing to be dried off and bread may be sorted out of the milking heard. As yet another example, a dairy cow may be sorted into one of a number of regions 110 based on the stage of lactation of the dairy cow (as dairy cows in different stages may require different feeds).

In certain other embodiments, the equipment portion 128 being located to the rear of stall portion 122 may allow pairs of milking boxes 120 to be located side by side such that the milking boxes share a wall 124 (e.g., wall 124b may be shared between milking box 120c and milking box 120d, as depicted in FIG. 1B). As a result, a single robotic attacher (e.g., robotic attacher 150, described below with regard to FIG. 3) may be shared by the pair of milking boxes 120, which may reduce to cost of installing multiple milking boxes 120 in the enclosure 100.

Figure 3:
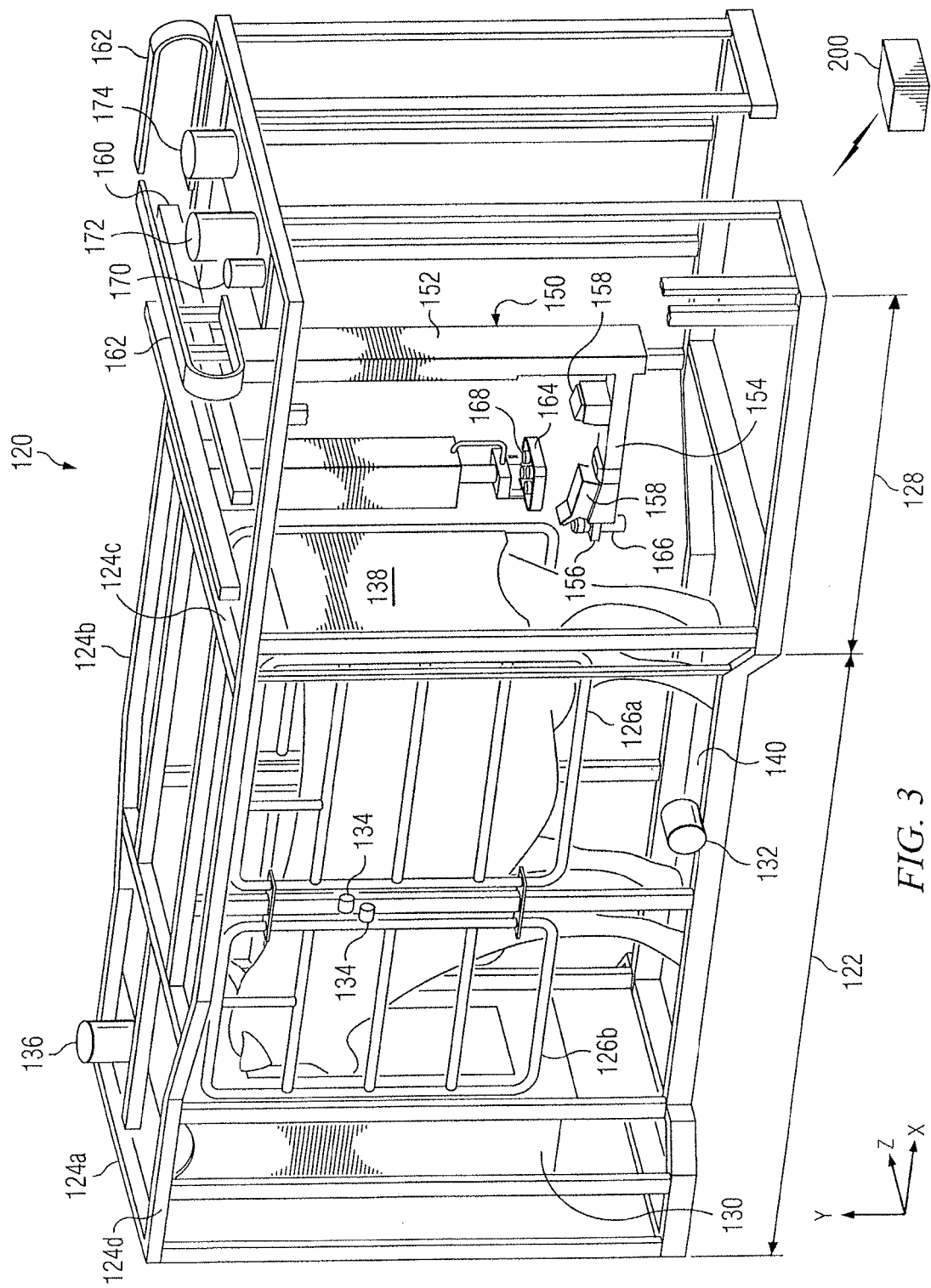
FIG. 3 illustrates a detailed perspective view of the example milking box depicted in FIG. 1, according to certain embodiments of the present disclosure.

FIG. 3 illustrates a detailed perspective view of an example milking box 120, according to certain embodiments of the present disclosure. As described above with regard to FIG. 1, milking box 120 may comprise a stall portion 122 (defined by walls 124 and gates 126) and equipment portion 128 located to the rear of stall portion 122. In certain embodiments, stall portion 122 of milking box 120 may include a feed bowl 130, a presence sensor 132, one or more gate sensors 134, and an identification sensor 136. Additionally, one or more of feed bowl 130, presence sensor 132, gate sensor(s) 134, and identification sensor 136 may be communicatively coupled to controller 200 (described above with regard to FIG. 2).

In certain embodiments, feed bowl 130 may dispense feed in order to attract a dairy cow so that the dairy cow will enter milking box 120 voluntarily. Accordingly, at least one of the entry gates 126a may remain open when there is no dairy cow present to allow a dairy cow to enter. Once the dairy cow has entered milking box 120, presence sensor 132 may detect the presence of the dairy cow. For example, presence sensor 132 may detect when the dairy cow has passed through the entrance gate 126a and/or when the dairy cow is generally centered in the stall portion 122. Upon detecting the presence of the dairy cow, presence sensor 132 may send a signal to controller 200. In response to the signal, controller 200 may cause one or more actuators to close gates 126. Gate sensor 134 may determine when gates 126 have closed. Gate sensor 134 may communicate a signal to controller 200 upon determining that gates 126 have closed. Controller 200 may initiate a milking procedure in response to the signal.

In certain embodiments, identification sensor 136 may determine the identity of the dairy cow. As an example, identification sensor 136 may comprise an antenna operable to read a radio frequency identification (RFID) from an ear tag, a collar, or other identifier associated with the dairy cow. Once the dairy cow has been identified, the identification sensor 136 may optionally be turned off to prevent wasting power and/or to minimize the dairy cow's exposure to radio waves.

Identification sensor 136 may communicate the identity of the dairy cow to controller 200 to facilitate retrieving information describing the dairy cow (e.g., from memory 240 or any other suitable location). Information describing the dairy cow may comprise historical data describing the particular dairy cow during a previous time period, such as a previous milking cycle. The previous milking cycle may refer to a milking cycle in which milking equipment was manually attached (e.g., by a user) or a milking cycle in which milking equipment was automatically attached (e.g., by a robotic attacher 150, described below). In certain embodiments, milking equipment may be attached manually the first time the dairy cow is milked in order to establish initial information describing the dairy cow, such as where the teats are located. The location of the dairy cow's teats may be described relative to a feature of the dairy cow, such as relative to the rear of the dairy cow, the hind legs, and/or a portion of the dairy cow's udder, such as a mid-line of the udder or relative to one or more of the other teats. A robotic attacher (e.g., robotic attacher 150, described below) may use the information describing the location of the teats during subsequent milkings to facilitate automatically attaching the milking equipment.

Examples of historical data include measurements, statistics, health information, and any other information describing the dairy cow during a previous time period. Examples of measurements include the length of the dairy cow (e.g., from head to tail) and the location of the dairy cow's teats during a previous milking cycle. Examples of statistics may include statistics describing when the dairy cow was last milked, the amount of milk produced in previous milking cycles, and so on. Examples of health information may include a designation not to milk the dairy cow due to a health problem or a designation to sort the dairy cow into a veterinary pen. In certain embodiments, a user may set an indicator in the database to indicate that the dairy cow should be sorted into the veterinary pen because the dairy cow is due for a check-up or because the user noticed the dairy cow appears to be ill or injured.

Controller 200 may use the information retrieved according to the identity of the dairy cow to determine how the particular dairy cow should be handled. If the information indicates the dairy cow should not be milked, controller 200 may cause an actuator to open one or more of the exit gates 126b. For example, if controller 200 determines that the dairy cow should be sorted into a particular region 110 of enclosure 100, such as a veterinary pen, it may cause the exit gate 126b that accesses the selected region 110 to open. Alternatively, controller 200 may cause multiple exit gates 126b to open if the dairy cow is to be given the option of which region 110 to occupy upon exiting milking box 120. In certain embodiments, a prod may be used to encourage the dairy cow to exit. Examples of prods include a noise, a mechanical device, or a mild electric shock.

Upon a determination that the dairy cow should be milked, controller 200 may continue the milking procedure. In certain embodiments, controller 200 may cause a dispenser to drop feed into feed bowl 130. Additionally, controller 200 may cause feed bowl 130 to move toward the dairy cow in order to encourage the dairy cow to move to a pre-determined part of stall portion 122. As an example, feed bowl 130 may be initially positioned in the front of stall portion 122 when the dairy cow enters. Feed bowl 130 may then move back toward the dairy cow to encourage the dairy cow to move to the rear of stall portion 122 (e.g., against backplane 138, described below) in order to facilitate attaching the milking equipment to the dairy cow. To ensure feed bowl 130 does not crowd the dairy cow, the amount of movement of feed bowl 130 may be customized to the size of the dairy cow. For example, a user may determine an appropriate location for feed bowl 130 the first time the dairy cow enters milking box 120. The location may be stored (e.g., in memory module 240 of controller 200) such that it may be retrieved during subsequent milkings according to the identity of the dairy cow. Alternatively, the feed bowl 130 may be configured to continue moving toward the rear of the stall portion 122 until the dairy cow contacts backplane 138 (e.g., as described with respect to FIGS. 11A-11D below), which may indicate that the dairy cow is positioned in a location that is suitable for attaching the milking equipment.

In certain embodiments, rear wall 124c of stall portion 122 includes a backplane 138. Backplane 138 may comprise any suitable configuration of materials suitable for locating the rear of the dairy cow in order to facilitate the efficient attachment of the milking equipment. In certain embodiments, the dairy cow may be backed toward backplane 138 by moving feed bowl 130 as described above. In certain other embodiments, backplane 138 may be moved forward toward the dairy cow. In certain other embodiments, a combination of backing the dairy cow toward backplane 138 and moving backplane 138 forward toward the dairy cow may be used. It may be determined that the rear of the dairy cow has been located when a portion of backplane 138, such as a pipe or bracket, touches the rear of the dairy cow at any suitable location, such as approximately mid-flank (i.e., between the udder and the tail). Backplane 138 may additionally include a manure gutter for directing manure toward a side of stall portion 122 (e.g., away from the dairy cow's udder and the milking equipment).

In certain embodiments, stall portion 122 may additionally include a waste grate 140 for disposing of waste. Waste grate 140 may have a rough surface to discourage the dairy cow from standing on it. In addition, waste grate 140 may be dimensioned such that when the dairy cow's hind legs are positioned on opposite sides of waste grate 140, the hind legs are separated to facilitate attachment of the milking equipment to the dairy cow's teats.

In certain embodiments, equipment portion 128 of milking box 120 may include a robotic attacher 150, one or more preparation cups 166, teat cups 168, pumps 170, receiver jars 172, milk separation containers 174, and/or any other suitable milking equipment. In certain embodiments, robotic attacher 150 may be suspended into equipment portion 128 from a rail 160. Rail 160 may be generally located above the level of the udder of a dairy cow located in stall portion 122 such that the teats of the dairy cow may be accessible to robotic attacher 150 when suspended from rail 160. For example, rail 160 may extend across the top of equipment portion 128 of milking box 120 and may be oriented substantially parallel to rear wall 124c.

Robotic attacher 150 may be communicatively coupled to controller 200 (e.g., via a network facilitating wireless or wireline communication). Controller 200 may cause robotic attacher to attach certain milking equipment to the dairy cow's teats. For example, in certain embodiments, robotic attacher 150 may access a storage area 164 to retrieve preparation cups 166 and/or teat cups 168. Preparation cups 166 may be adapted to clean the teats, stimulate the flow of milk, and discard fore milk from the teat (e.g., the first few millimeters of milk that may be dirty). Teat cups 168 may be adapted to extract milk from the dairy cow. Preparation cups 166 and/or teat cups 168 attached to extendable hoses may by hung within storage area 164 between milkings to protect the cups from manure and flies. When it is time to milk the dairy cow, robotic attacher 150 may pull preparation cups 166 from storage area 164 and attach them to the dairy cow one at a time, two at a time, or four at a time. After the teats have been prepared, preparation cups 166 may be removed and teat cups 168 may be attached one at a time, two at a time, or four at a time. Once the cups are attached, robotic attacher 150 may withdraw to prevent the dairy cow from causing accidental damage to the equipment, and the system may proceed with milking the dairy cow.

During milking, pump 170 may pump good milk from teat cup 168 to receiver jar 172 to be stored at a cool temperature. Pump 170 may pump bad milk to milk separation container 174 to be discarded. Milk may be determined to be bad based on testing the milk and/or based on the particular dairy cow from which the milk has been extracted. For example, information retrieved from a database according to the dairy cow's identifier may indicate that the milk should be discarded because the dairy cow is ill or has recently calved.

In certain embodiments, robotic attacher 150 comprises a main arm 152, a supplemental arm 154, a gripping portion 156, and a vision system 158. In certain embodiments, the movement of main arm 152, supplemental arm 154, and gripping portion 156 may be varied in response to signals received from controller 200 (as described in further detail in FIG. 4 below). Although the components of robotic attacher 150 are depicted and primarily described as oriented in a particular manner, the present disclosure contemplates the components having any suitable orientation, according to particular needs.

In order to obtain access to the dairy cow's teats, main arm 152, supplemental arm 154, and gripping portion 156 may work together to facilitate movement in three dimensions, for example, according to an x-axis, a y-axis, and a z-axis. As illustrated, the x-axis extends in the direction of the dairy cow's length (e.g., from head-to-tail), the y-axis extends in the direction of the dairy cow's height, and the z-axis extends in the direction of the dairy cow's width.

Main arm 152 may comprise a vertical arm movably coupled to rail 160. For example, a hydraulic cylinder may movably couple main arm 152 to rail 160. Main arm 152 may traverse rail 160 to facilitate movement of robotic attacher 150 along the z-axis. Accordingly, rail 160 may comprise a track and rollers adapted to support the weight of robotic attacher 150 and to facilitate movement of main arm 152 back-and-forth along rail 160. To prevent wires and hoses from interfering with the movement of main arm 152 along rail 160, guides 162 may be used to loosely hold the wires and hoses in place. For example, guides 162 may comprise U-shaped brackets that allow the wires and hoses to extend a sufficient amount to accommodate movements of main arm 152, but prevent the wires and hoses from dangling in the path of main arm 152.

Main arm 152 attaches to supplemental arm 154. Supplemental arm 154 facilitates movements in any direction. That is, supplemental arm 154 moves in-and-out along the x-axis, up-and-down along the y-axis, and/or from side-to-side along the z-axis. Accordingly, supplemental arm may extend between the rear legs of the dairy cow located within stall portion 122 in order to attach milking equipment to the dairy cow. Supplemental arm 154 may comprise gripping portion 156. Gripping portion 156 may grip a preparation cup 166 or a teat cup 168 for attachment to the dairy cow's teat. Gripping portion 156 may comprise a wrist adapted to perform fine movements, such as pivot and tilt movements, to navigate around the dairy cow's legs and to access the dairy cow's teats. Additional description of robotic attacher 150 may be found in FIGS. 7-10 below. To determine the location of the dairy cow's legs and teats, robotic attacher 150 may use vision system 158. An example embodiment of vision system 158 is described with respect to FIGS. 4A-4C below.

Figure 4A:
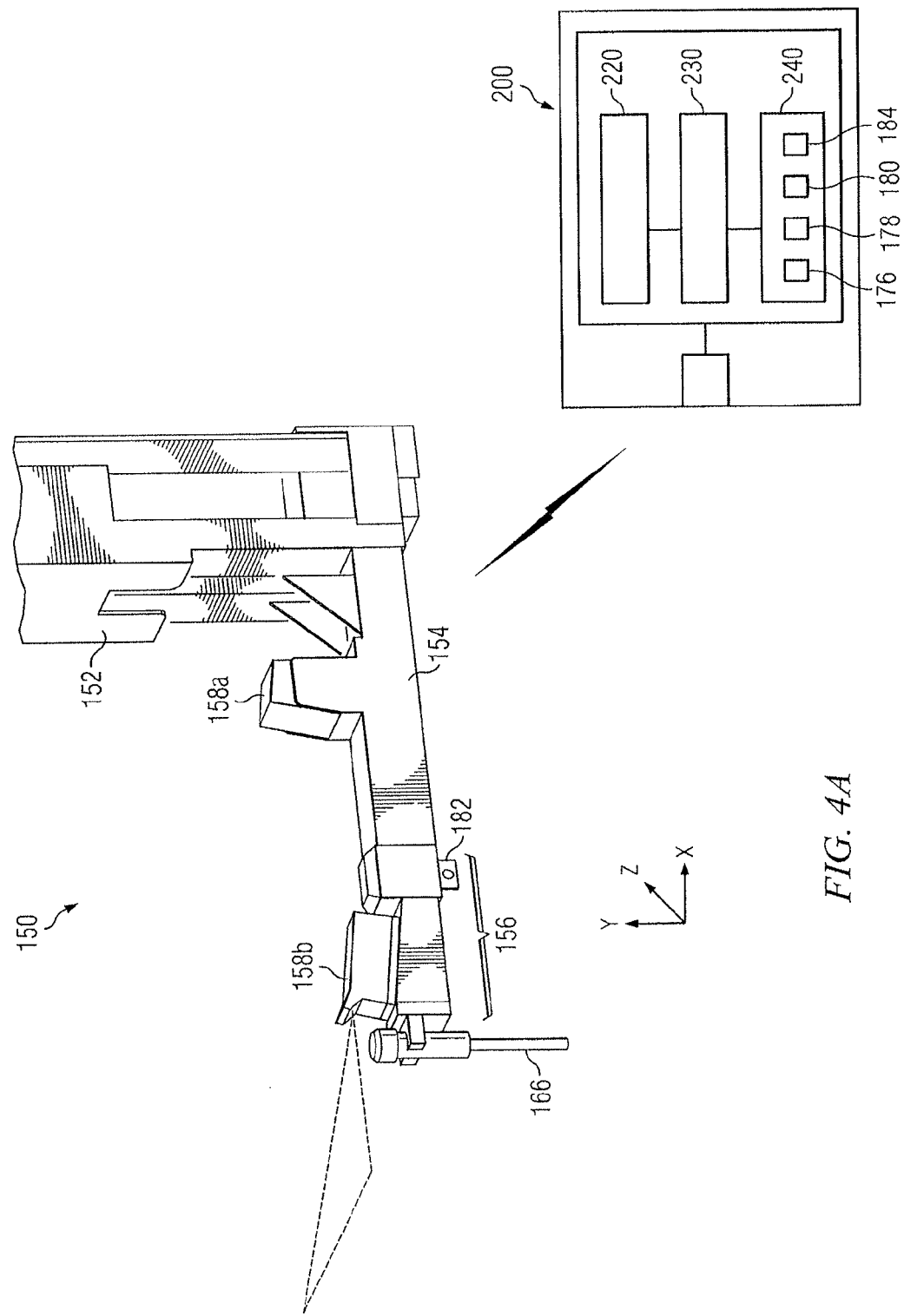
FIG. 4A illustrates a detailed perspective view of the example robotic attacher depicted in FIG. 3, according to certain embodiments of the present disclosure.

FIG. 4A illustrates a detailed perspective view of an example of robotic attacher 150, according to certain embodiments of the present disclosure. Robotic attacher 150 may include a main arm 152, a supplemental arm 154, a gripping portion 156, and a vision system 158. As described with respect to FIG. 3, robotic attacher 150 may be communicatively coupled to controller 200. Controller 200 may cause robotic attacher to retrieve a cup, such as preparation cup 166 or teat cup 168, move the cup toward a teat of a dairy cow within milking box 120, and attach the cup to the teat.

In general, the teats of the dairy cow may be relatively less visible when looking at the dairy cow from the rear and relatively more visible when looking at the dairy cow from the side. Vision system 158 may facilitate locating the teats from a position to the rear of the dairy cow. Vision system 158 may include multiple cameras, such as a first camera 158a and a second camera 158b. In certain embodiments, cameras 158a, 158b may be coupled to robotic attacher 150 and may be positioned at any suitable location along main arm 152 or supplemental arm 154. As an example, second camera 158b may be coupled to gripping portion 156 of supplemental arm 154 at a location proximate to the part of gripping portion 156 adapted to hold a teat cup, and first camera 158a may be coupled to supplemental arm 154 at a location between second camera 158b and main arm 152.

In some embodiments, first camera 158a may be coupled to supplemental arm 156 in a first fixed location and second camera 158b may be coupled to supplemental arm in a second fixed location. Controller 200 may maintain calibration information indicating the distance along the x-axis between first camera 158a and a first calibration point and/or the distance along the x-axis between second camera 158b and a second calibration point. The location of the first calibration point may be either the same as or different from the location of the second calibration point, and each calibration point may correspond to any suitable x-axis location on robotic attacher 150. Examples of calibration points may include a point aligned with a feature of first camera 158a, such as the midpoint of the lens of first camera 158a, a point aligned with a feature of second camera 158b, such as the midpoint of the lens of second camera 158b, a midpoint of the teat cup gripping claws of robotic attacher 150, and/or any other suitable point. Controller 200 may use the calibration information when positioning supplemental arm 154 in order to provide cameras 158a,b with relatively good visibility of the features of the cow, to determine where to place milking equipment (e.g., teat cup 168), and/or to prevent robotic attacher 150 from colliding with the cow.

In operation, controller 200 may access a first image 176 generated by first camera 158a (e.g., from memory module 240) and use first image 176 to determine, using any suitable logic 220, a reference point 178 proximate to the udder, which may then be stored (e.g., in memory module 240). The reference point 178 may be defined relative to certain features of the dairy cow, such as the hind legs and/or the udder. Controller 200 may send a signal to robotic attacher 150 causing robotic attacher 150 to position second camera 158b relative to the reference point 178. Accordingly, second camera 158b may have a consistent point of reference from one milking cycle to the next, which may allow the teats to be located efficiently. Controller 200 may access a second image 180 generated by second camera 158b (e.g., from memory module 240) in order to determine, using any suitable logic 220, a location of a teat.

In certain embodiments, first camera 158a may comprise a three-dimensional camera adapted to generate a first image 176 depicting the rear of the dairy cow, including the hind legs and the udder. Using a three-dimensional camera may facilitate generating a relatively complete image of the rear of the dairy cow within approximately a couple of seconds (e.g., one second), which may be faster than the amount of time it would take for a two-dimensional camera to generate a similar image. In certain embodiments, second camera 158b may comprise a two-dimensional camera adapted to generate a second image 180 depicting at least a portion of the udder to facilitate locating the teats. Second camera 158b may facilitate locating the end of each teat with a relatively high degree of accuracy, such as within a few millimeters. The location of the teat may be used to instruct robotic attacher 150 where to attach the milking equipment.

First camera 158a may begin generating the first image 176 in response to a signal from controller 200 indicating that the dairy cow is positioned proximate to the milking equipment. As an example, the signal may indicate that the rear of the dairy cow has been detected by the backplane 138 of the milking box 120. First camera 158a may begin generating the first image 176 from a starting point and may update the first image 176 in real-time as robotic attacher 150 approaches the dairy cow. The starting point may be determined according to a default position of robotic attacher 150 (e.g., a position determined relative to milking stall 122). Thus, the starting point may be determined without the use of historical data associated with the particular dairy cow being milked. First camera 158a may communicate the first image 176 to controller 200, and controller 200 may use the image to locate main features of the dairy cow, such as the right hind leg, the left hind leg, the udder, and/or the tail.

Controller 200 may determine the reference point 178 based on the location of the main features of the dairy cow. The reference point 178 may be defined relative to certain features of the dairy cow, such as the hind legs and/or the udder. As an example, the reference point 178 may be defined between the hind legs and/or below the udder. For example, in certain embodiments, the reference point 178 may be located proximate to a mid-point of the udder. The mid-point of the udder may refer to a point generally located between the front teats and the rear teats in the x-direction and/or between the left teats and the right teats in the z-direction. In certain embodiments, the mid-point of the udder may be estimated prior to determining the precise location of the teats, for example, according to the general size and location of the udder. The reference point 178 may be spaced apart from the dairy cow in the y-direction to minimize the likelihood that second camera 158b touches the dairy cow. For example, the reference point 178 may be located a few inches below the mid-point of the udder.

Controller 200 may communicate the reference point 178 and/or information describing the main features of the dairy cow to robotic attacher 150. The reference point 178 may be used to position second camera 158b. The information describing the main features of the dairy cow may be used to prevent robotic attacher 150 from colliding with the dairy cow when navigating second camera 158b toward the reference point 178. Information describing the main features of the dairy cow may include the position of the hind legs, the space between the hind legs, the position of the udder, the height of the udder, the position of the tail, and/or other information. Once robotic attacher 150 has positioned second camera 158b relative to the reference point 178, second camera 158b may begin scanning the udder.

In certain embodiments, second camera 158b may determine where to look for one or more of the teats according to historical data. The historical data may be received from controller 200 and may describe a previously-determined location of the teats relative to the reference point 178. The previously-determined location may be based on the location of the teats during one or more previous milking cycles. As an example, the previously-determined location may comprise the location of the teats during the most recent milking cycle. As another example, the previously-determined location may comprise an average of the locations of the teats during a number of previous milking cycles. As another example, the previously-determined location may comprise the location of the teats during a previous milking cycle in which the udder was likely to be as full of milk as the current milking cycle. For example, if eight hours have elapsed since the dairy cow was last milked, the previously-determined location may be determined from a previous milking cycle in which the dairy cow had not been milked for approximately eight hours. Referring to historical data may minimize the area that second camera 158b must scan in order to locate the teat and may reduce the amount of time required to locate the teat.

Second camera 158b may communicate the second image 180 to controller 200, and controller 200 may access the second image 180 to locate the teats of the dairy cow. As described above, in certain embodiments, second camera 158b may comprise a two-dimensional camera, such as a horizontal laser. If the horizontal laser may scan a portion of the udder other than the teats (e.g., a relatively even surface of the udder), the scan communicated to controller 200 may generally resemble a substantially solid line. If the horizontal laser scans a portion of the udder that includes the teats, the scan communicated to controller 200 may generally resemble a broken line depicting the teats and the spaces between the teats. As an example, controller 200 may determine that a teat has been located if the scan comprises a broken line in which a solid portion of the line generally corresponds to the width of a teat and the broken portions of the line generally correspond to the proportions of the space between teats.

Figure 8A:
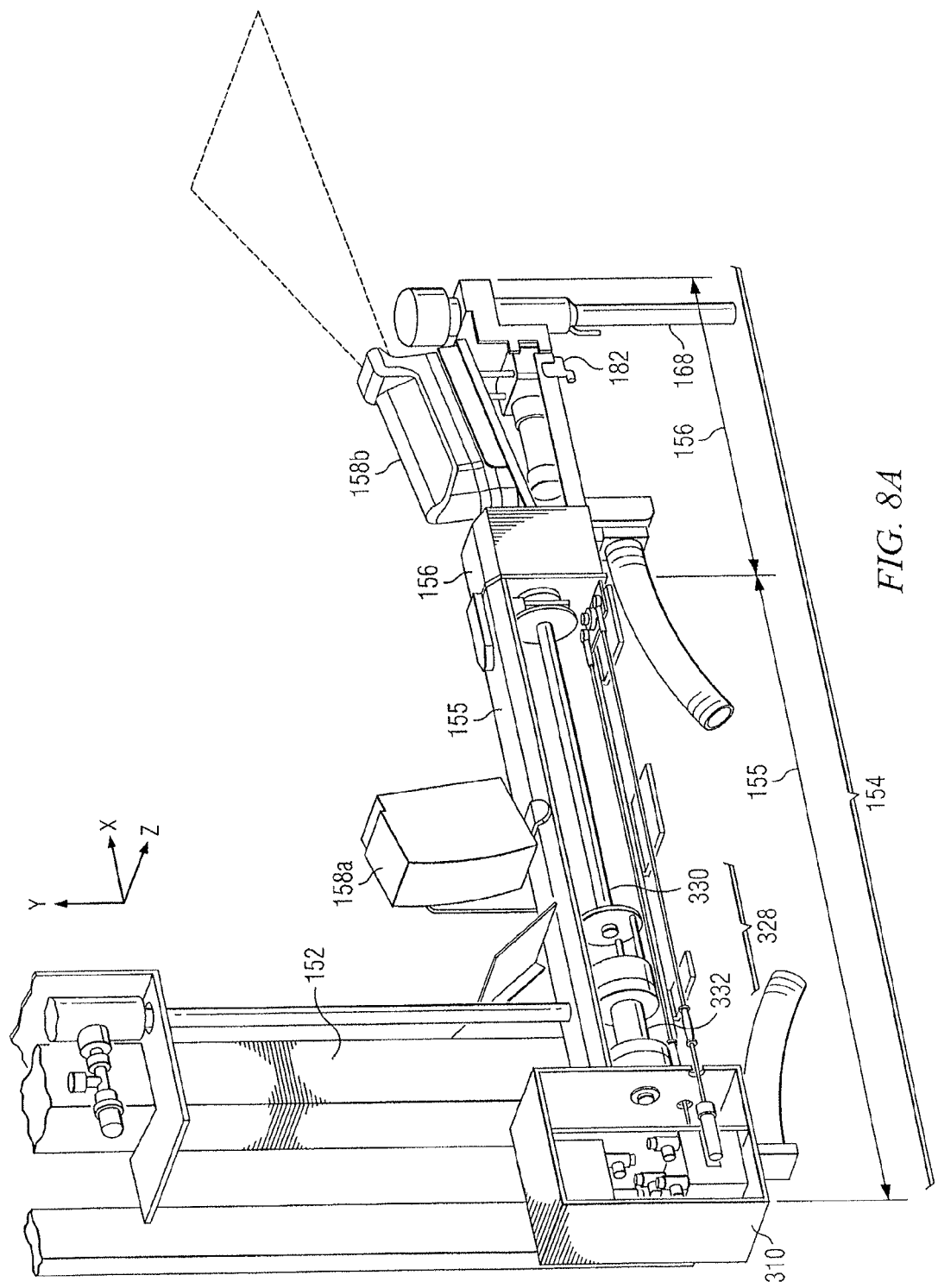
FIG. 8A-8D illustrate an example of a pivot system for facilitating pivot movements of the robotic attacher depicted in FIG. 3, according to certain embodiments of the present disclosure.
Figure 9A:
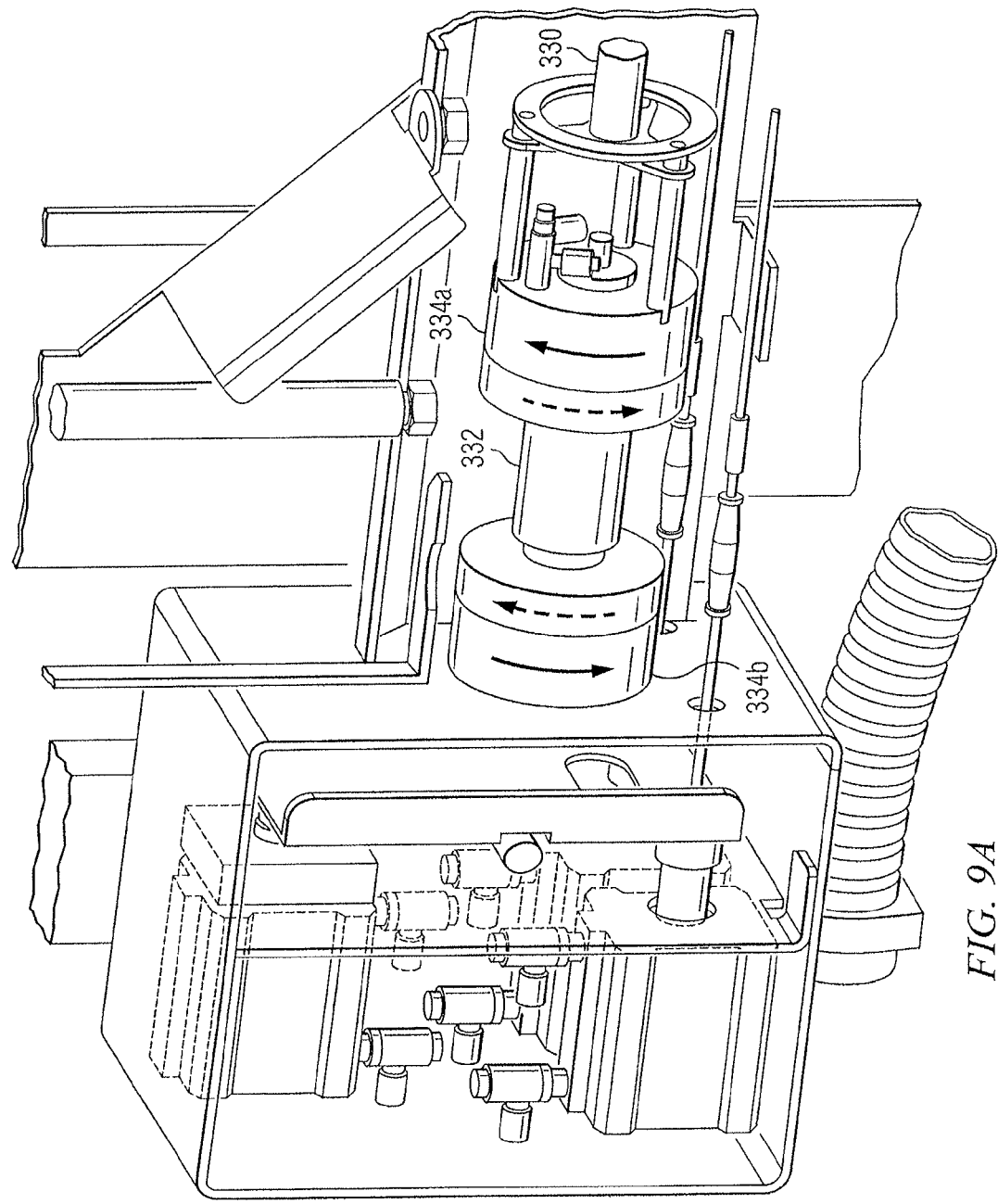
FIGS. 9A-9B illustrates an example of a rotating assembly for facilitating rotational movements of the robotic attacher depicted in FIG. 3, according to certain embodiments of the present disclosure.
Figure 9B:
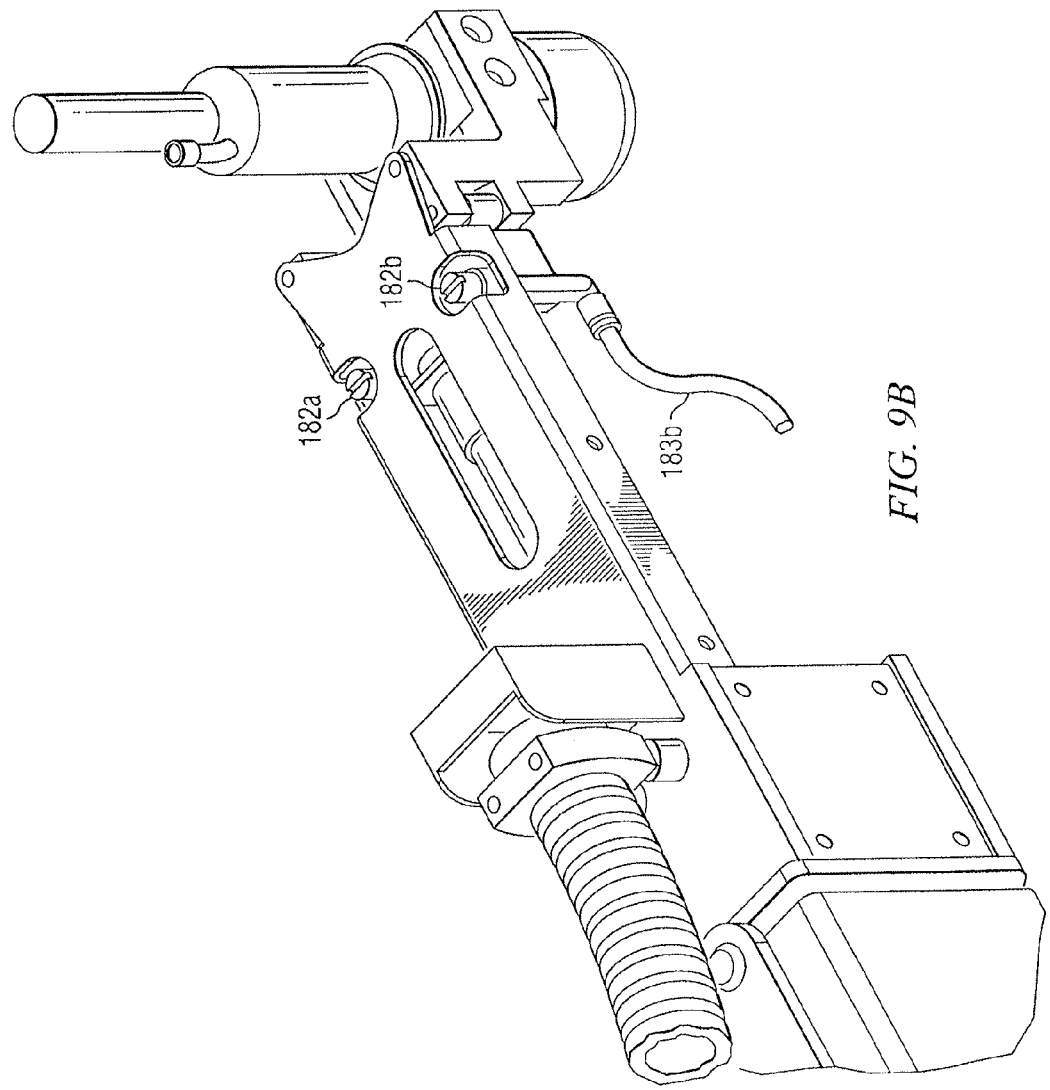

In certain embodiments, robotic attacher 150 may further comprise a nozzle 182. Nozzle 182 may be coupled to gripping portion 156. Nozzle 182 may spray disinfectant on the teats of the dairy cow at the end of a milking cycle, that is, after the dairy cow has been milked and the teat cups have been removed. The disinfectant may be sprayed to prevent mastitis or other inflammation or infection. In certain embodiments, gripping portion may be operable to rotate 180° around the x-axis. During milking, second camera 158b may be generally oriented on top of gripping portion 156, and nozzle 182 may be generally oriented underneath gripping portion 156 (i.e., opposite second camera 158b). Orienting nozzle 182 underneath gripping portion 156 during milking may prevent milk or other contaminants from accessing nozzle 182. Once the milking has been completed, gripping portion 156 may rotate such that nozzle 182 may be generally oriented on top of gripping portion 156, and second camera 158b may be generally oriented underneath gripping portion 156. Orienting nozzle 182 on top of gripping portion 156 after milking may facilitate spraying the teats with disinfectant from nozzle 182. FIG. 8A and FIGS. 9A-9B below illustrate an example of a rotating assembly for rotating gripping portion 156.

Figure 4B:
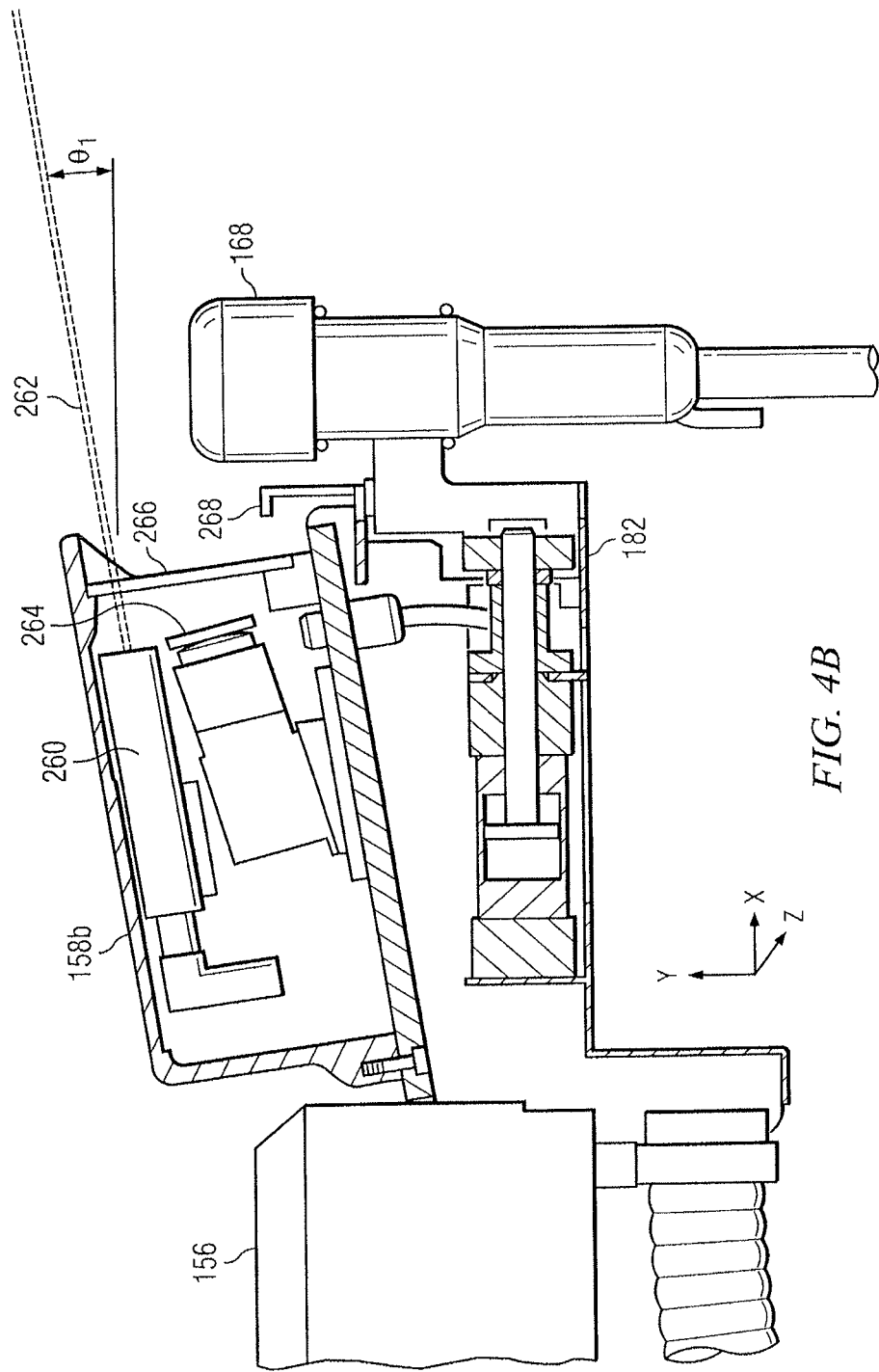
FIG. 4B illustrates an example of a side plan view of a camera coupled to the robotic attacher depicted in FIG. 3, according to certain embodiments of the present disclosure.

FIGS. 4B-4C illustrate examples of a side plan view and a front plan view of second camera 158b, respectively, according to certain embodiments of the present disclosure. In certain embodiments, second camera 158b includes a transmitter 260 that transmits a signal 262 and a lens 264 that receives a reflection of signal 262. Lens 264 may provide the reflection of signal 262 to image processing components operable to generate second image 180. In some embodiments, signal 262 comprises a two-dimensional laser signal. Transmitter 264 may transmit signal 262 as a horizontal plane oriented at a fixed angle $\theta_1$ relative to the x-axis of supplemental arm 154. For example, when second camera 158b is positioned in an upright orientation, angle $\theta_1$ may be configured at an upward angle between 5 and 35 degrees relative to the x-axis.

In some embodiments, second camera 158b includes a protective layer 266 positioned in front of lens 264. Protective layer 266 may comprise glass, plastic, or any material suitable for protecting lens 264 from fluids and debris. Supplemental arm 154 may include a camera-facing nozzle 268 operable to spray water or any other cleanser on protective layer 266, for example, in response to a signal from controller 200. In some embodiments, controller 200 may initiate spraying protective layer 266 upon a determination that a milking cycle has been completed. Periodically spraying protective layer 266 with cleanser may prevent debris from collecting in front of lens 264. Protective layer 266 may optionally include an anti-condensation system, such as an electrical defog system or an air nozzle to prevent condensation from collecting on protective layer 266.

Figure 5A:
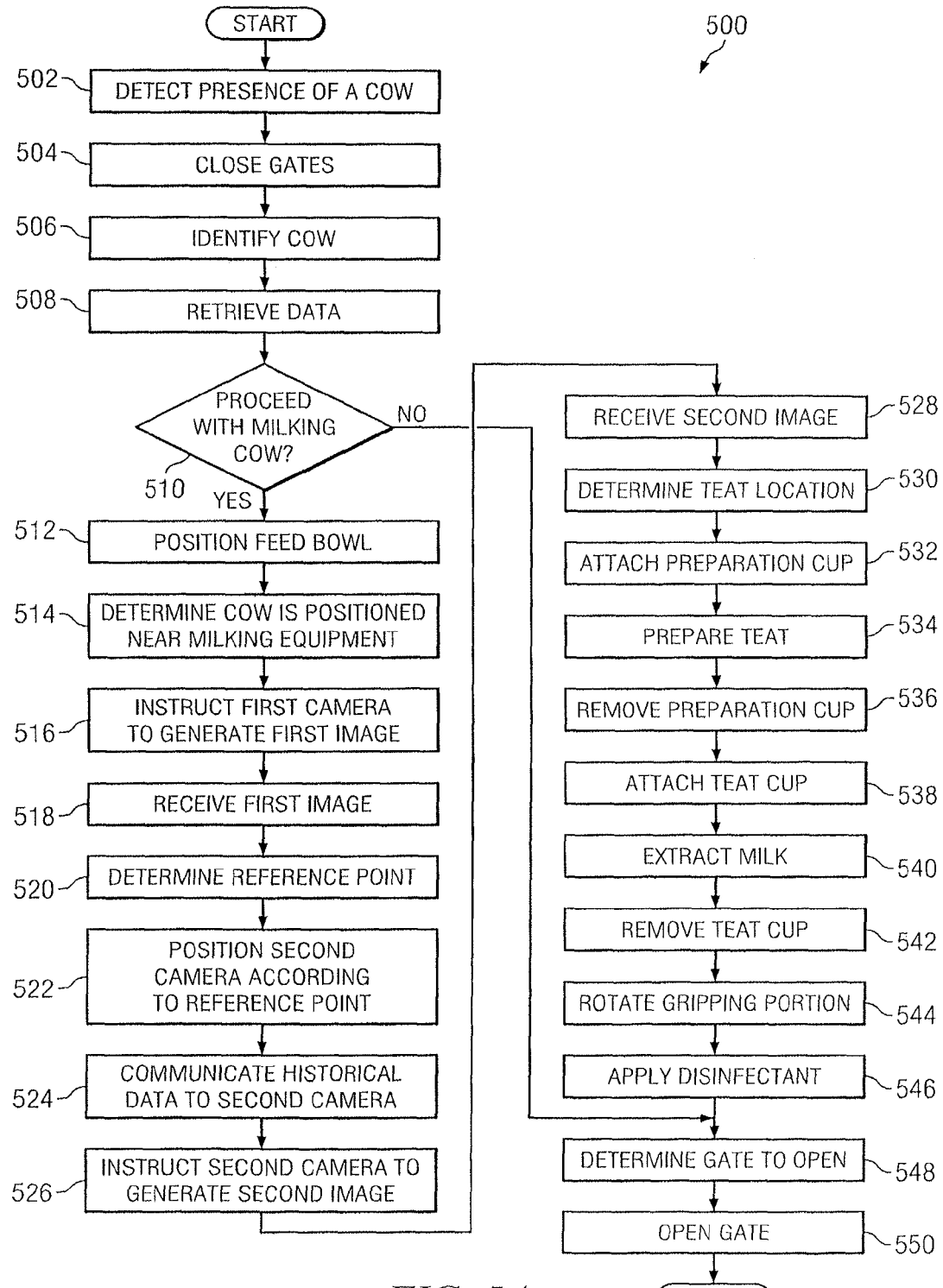
FIG. 5A illustrates an example method for milking a dairy cow using the example milking box depicted in FIGS. 1-4, according to certain embodiments of the present disclosure.

FIG. 5A illustrates an example method 500 for milking a dairy cow using the example milking box 120 depicted in FIGS. 1-4, according to certain embodiments of the present disclosure. In certain embodiments, milking box 120 may be positioned within enclosure 100, and at least one of the gates 126 of stall portion 122 may be opened to allow the dairy cow to voluntarily enter milking box 120. At step 502, presence sensor 132 detects the presence of the dairy cow. Presence sensor 132 communicates a signal to controller 200 indicating the presence of the dairy cow has been detected. Controller 200 sends a signal to an actuator causing gates 126 to close at step 504. Thus, the dairy cow is prevented from exiting the milking box. Gate closed sensor 134 determines that the gates are closed and communicates a gate-closed signal to controller 200. In response to the gate-closed signal, controller 200 causes the milking procedure to proceed to the next step. For example, controller 200 sends a signal requesting identification sensor 136 to provide an identifier associated with the dairy cow.

At step 506, identification sensor 136 reads an ear tag, collar, or other identifier (e.g., an RFID signal) associated with the dairy cow. Identification sensor 136 communicates the identifier to controller 200 to facilitate determining the identity of the cow. At step 508, controller 200 retrieves information associated with the particular dairy cow according to the determined identity of the dairy cow. For example, information may be retrieved from memory 240. Controller 200 determines whether to proceed with milking the dairy cow at step 510. The determination may be made according to the information associated with the dairy cow. For example, if the information indicates that the dairy cow is ill or that the dairy cow has already been milked in the current milking cycle, a determination may be made not to proceed with milking the dairy cow. Alternatively, if the information indicates that the dairy cow is healthy and that it is time to milk the dairy cow, a determination may be made to proceed with milking the dairy cow. If the dairy cow is to be milked, the method continues to step 512. If the dairy cow is not to be milked, the method skips to step 548.

At step 512, controller 200 causes a dispenser to drop feed into feed bowl 130 and positions feed bowl 130. In certain embodiments, feed bowl 130 may move toward the rear of the stall to encourage the dairy cow to back-up toward the milking equipment. Controller 200 determines that the dairy cow is positioned near the milking equipment at step 514. For example, a signal received from backplane 138 of milking box 120 may be used to determine that the dairy cow is positioned near the milking equipment. The signal may indicate when the rear of the dairy cow touches a portion of backplane 138. Upon determining the dairy cow is positioned near the milking equipment (e.g., toward the rear of the stall portion of the milking box), controller 200 instructs first camera 158a to generate a first image 176 of the rear of the dairy cow at step 516. In certain embodiments, first camera 158a may be positioned on robotic attacher 150, and first camera 158a may begin generating the first image 176 in-flight, that is, as robotic attacher 150 retrieves a preparation cup 166 or teat cup 168 from storage and begins moving the cup toward the udder. At step 518, controller 200 receives the first image 176. The first image 176 includes main features of the dairy cow, such as the hind legs, the udder, and/or the tail. Controller 200 accesses the first image 176 to determine a reference point 178 at step 520. As an example, the reference point 178 may comprise a point between the dairy cow's hind legs, a point below the dairy cow's udder, and/or a point proximate to a mid-point of the udder. The mid-point may refer to a point between a first teat and a second teat (e.g., between a left teat and a right teat and/or between a front teat and a rear teat).

At step 522, controller 200 sends a signal causing robotic attacher 150 to position second camera 158b relative the reference point 178. Controller 200 communicates historical data to second camera 158*b* at step 524. The historical data may comprise data retrieved from a database that indicates a previously-determined location of the teats during a previous milking cycle. The previously-determined location may be described relative to the reference point 178. The method proceeds to step 526 where controller 200 sends a signal causing second camera 158*b* to generate a second image 180. Second camera 158*b* may generate the second image 180 by scanning a portion of the udder indicated by the historical data. Second camera 158*b* may scan the whole teat to facilitate identifying the angle of the teat and the point attachment. At step 528, the controller 200 receives the second image 180 from the second camera. Controller 200 accesses the second image 180 to determine the location of the teats at step 530. The teats may be located in any suitable manner, such as one at a time, two at a time, or four at a time.

Upon determining the location of the teats, controller 200 causes robotic attacher 150 to attach one or more preparation cups 166 at step 532. Second camera 158*b* may continue to scan the teat while the preparation cup is being attached. Continuing to scan the teat may allow for efficient attachment of the preparation cup. In addition, continuing to scan the teat may allow the preparation cup to be attached at a suitable angle, with the mouthpiece centered on the teat, to prevent folding the teat into the preparation cup. Vacuum pressure may be used to hold the preparation cups in place. Preparation cup 166 facilitates preparing the teat at step 534. Preparation may include cleaning the teat, stimulating the flow of milk, and discarding fore milk from the teat. After each of the teats have been prepared, preparation cups 166 may be removed at step 536. For example, the vacuum pressure may be released to remove the preparation cups and the preparation cups may be returned to the storage area.

Preparation cup(s) 166 may be attached to the teats of the cow in any suitable sequence. In some embodiments, the same preparation cup 166 may be used to prepare each of the teats, and the preparation sequence may be determined based on the storage location of preparation cup 166. For example, if preparation cup 166 is stored on the right side of equipment portion 128 (e.g., to the right of robotic attacher 150), the teats may be prepared in the sequence of left front teat, right front teat, right rear teat, and left rear teat. Accordingly, robotic attacher 150 may perform steps 516-536 to prepare the left front teat. After preparing the left front teat, robotic attacher 150 may return to reference point 178 and perform steps 526-536 to prepare the right front teat. After preparing the right front teat, robotic attacher may return to reference point 178 and perform steps 526-536 to prepare the right rear teat. After preparing the right rear teat, robotic attacher 150 may return to reference point 178 and perform steps 526-536 to prepare the left rear teat.

In some embodiments, robotic attacher 150 maintains the preparation cup 166 within stall portion 122 of milking box 120 from the time that preparation cup 166 is attached to the left front teat through the time that preparation cup 166 is attached to the left rear teat. Maintaining preparation cup 166 within stall portion 166 may allow robotic attacher 150 to navigate from one teat to the next using only second images 180 from second camera 158*b*, that is, without requiring additional first images 176 from first camera 158*a*. After detaching preparation cup 166 from the left rear teat, preparation cup 166 may be retracted to equipment portion 128 of milking box 120. The preceding discussion describes an example in which preparation cup 166 is stored on the right side of equipment portion 128. An analogous procedure may be performed if preparation cup 166 is stored on the left side of equipment portion 128 (e.g., to the left of robotic attacher 150) by preparing the teats in the sequence of right front teat, left front teat, left rear teat, and right rear teat.

The method continues to step 538, where controller 200 causes robotic attacher 150 to attach a teat cup 168. For example, teat cup 168 may be retrieved from storage area 164 and navigated to the teat. Second camera 158*b* may continue to scan the teat while the teat cup 168 is being attached to ensure proper placement of the teat cups. Vacuum pressure may be used to attach the teat cup 168. A sensor may be used to determine the vacuum pressure associated with each teat cup 168. If the vacuum level is low, it may indicate that teat cup 168 has fallen off and needs to be reattached. In certain embodiments, additional teat cups 168 may be attached by re-performing steps 522-530 to locate additional teats.

Figure 5B:
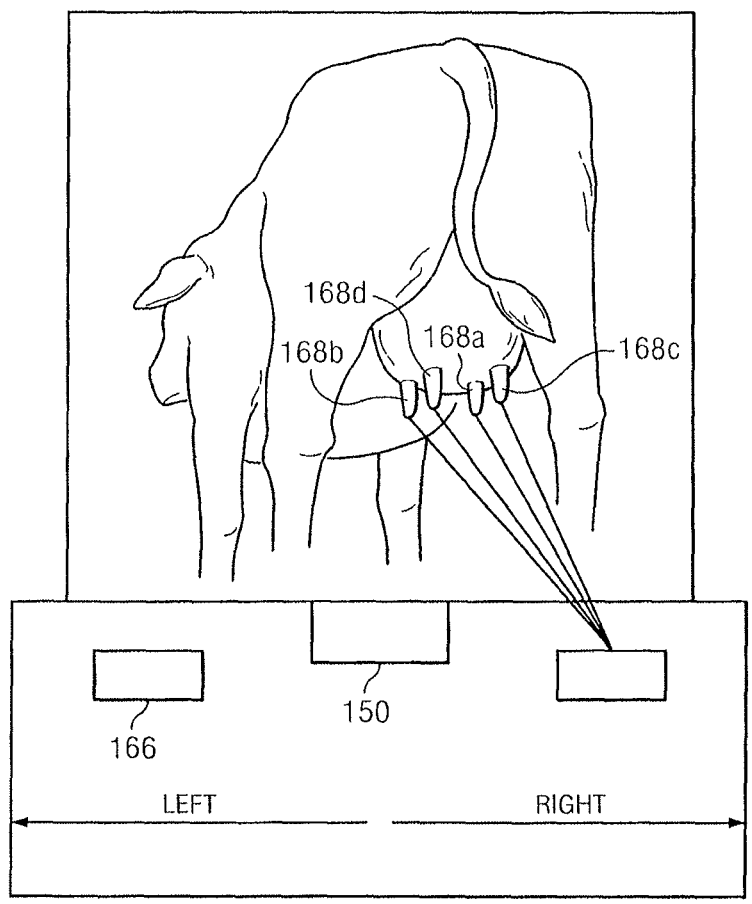
FIG. 5B illustrates an example of a sequence for attaching teat cups to the teats of a dairy cow, according to certain embodiments of the present disclosure.

Teat cup(s) 168 may be attached to the teats of the cow in any suitable sequence. In some embodiments, four teat cups 168 may be used to milk the cow (one teat cup 168 per teat). The attachment sequence may be determined based on the storage location of teat cups 168. Teat cups 168 may be stored on the side of equipment portion 128 opposite preparation cup(s) 166. Alternatively, teat cups 168 may be stored on the same side of equipment portion 128 as preparation cup(s) 166. FIG. 5B illustrates an example in which four teat cups 168*a-d* are stored on the right side of equipment portion 128 and the attachment sequence follows the order of right front teat (teat cup 168*a*), left front teat (teat cup 168*b*), right rear teat (teat cup 168*c*), and left rear teat (teat cup 168*d*). Alternatively, if teat cups 168 are stored on the left side of equipment portion 128 (not shown), teat cups 168 may be attached in the sequence of left front teat, right front teat, left rear teat, and right rear teat. Each time robotic attacher 150 retrieves one of the teat cups 168 from equipment portion 128, robotic attacher may determine reference point 178 and then perform steps 522-530 to locate the next teat in the sequence. Determining the reference point may include receiving an updated first image 176 from first camera 158*a* (e.g., repeating steps 516-520) and/or retrieving reference point 178 from memory module 240. Attaching the teat cups in sequence may reduce the likelihood of robotic attacher 150 bumping into an attached teat cup 168 or a milking hose during the process of attaching another teat cup 168.

Returning to FIG. 5A, once teat cups 168 have been attached to all four teats, robotic attacher 150 may retract and the method may proceed to step 540 to extract milk from the dairy cow. As an example, milk may be extracted by applying pulsation to the teat cup. A sensor may monitor the flow of milk. If the flow becomes low, it may be determined whether teat cup 168 should be removed or reattached. For example, if teat cup 168 has been attached for at least approximately one-and-a-half minutes and/or the amount of milk extracted is consistent with previous milking cycles, it may be determined that teat cup 168 should be removed, otherwise, it may be determined that teat cup 168 should be reattached. When it is determined that teat cup 168 should be removed, controller 200 initiates step 542 to remove teat cups 168. For example, controller 200 may send a signal causing the vacuum pressure to be released to allow teat cups 168 to drop from the teats. Teat cups 168 may be returned to storage area 164 by retracting hoses attached to teat cups 168 or by any other suitable method. Controller 200 then sends a signal to robotic attacher 150 to cause gripping portion 156 to rotate at step 544 in order to orient nozzle 182 toward the teat. The method applies disinfectant to the teat at step 546 by spraying the disinfectant through nozzle 182.

At step 548, controller 200 determines which gate(s) 126 to open. Selectively opening gates 126 may allow the dairy cow to be sorted into a particular region 110 of enclosure 100. The dairy cow may be sorted if its milk tested bad, if it failed to produce a sufficient amount of milk, if information retrieved from a database indicates the dairy cow should be sorted, or for other suitable reasons. Controller 200 sends a signal causing an actuator to open the selected gate(s) at step 550. In certain embodiments, a prod may be used to encourage the dairy cow to exit the milking box. The dairy cow exits the milking box and the method ends.

Figure 6:
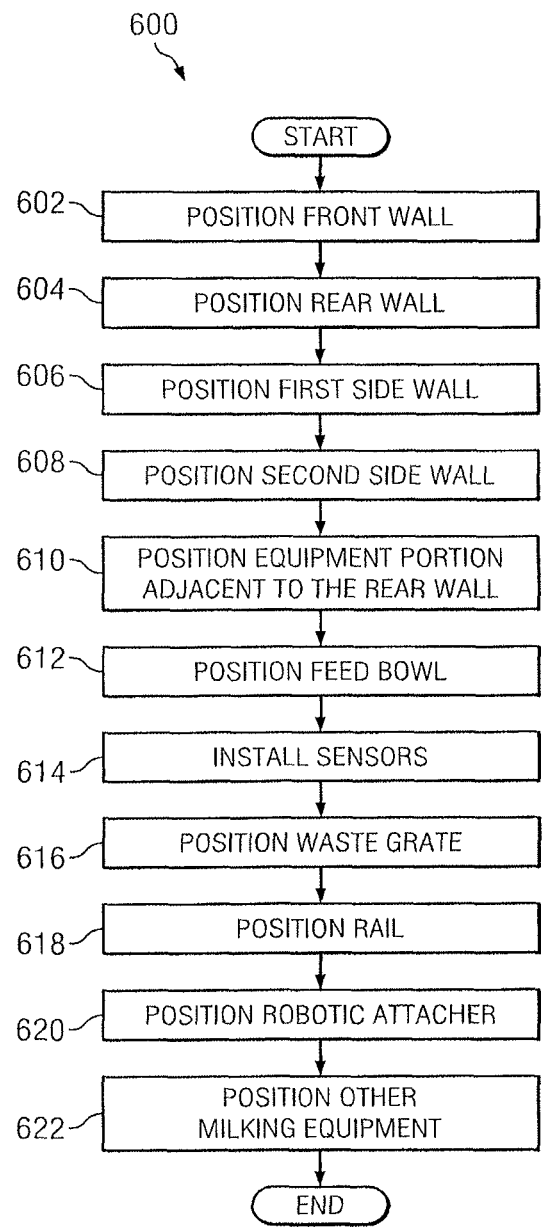
FIG. 6 illustrates an example method for installation of the example milking box depicted in FIGS. 1-4, according to certain embodiments of the present disclosure.

FIG. 6 illustrates an example method 600 for installation of milking box 120, according to certain embodiments of the present disclosure. The method may begin by positioning walls 124 in order to define stall portion 122. For example, the method positions a front wall 124a at step 602. The method proceeds to step 604 where a rear wall 124c is positioned substantially parallel to front wall 124a. Rear wall 124c may be spaced apart from front wall 124a a suitable distance to accommodate a dairy cow. At step 606, a first side wall 124b is positioned to extend between front wall 124a and rear wall 124c. The first side wall may include one or more gates, such as an entry gate 126a and an exit gate 126b. The method proceeds to step 608 to position a second side wall 124d to extend between front wall 124a and rear wall 124c. Second side wall 124d may be spaced apart from first side wall 124d in order to accommodate a dairy livestock within stall portion 122. Second side wall 124d may or may not include gates 126. For example, in certain embodiments, second side wall 124d may comprise a second entry gate 126a and a second exit gate 126b. In alternative embodiments, second side wall 124d may be positioned adjacent a second milking box and may define a boundary between milking box 120 and the adjacent milking box. In step 610, an equipment portion 128 is positioned to the rear of milking box 120, adjacent rear wall 124c. Rear wall 124c may comprise a backplane 138 adapted to physically contact a mid-flank portion of the dairy livestock when the dairy livestock is positioned proximate to equipment portion 128 of milking box 120.

At step 612, a movable feed bowl 130 may be positioned within milking box 120. Movable feed bowl 130 may be adapted to move from the front of milking box 120 toward the rear of milking box 120 to encourage the dairy livestock to back-up toward backplane 138. The method may proceed to step 614 to install a plurality of sensors within milking box 120. Examples of sensors include a presence sensor 132 adapted to detect the presence of the dairy livestock within milking box 120, one or more gate closed sensors 134 to detect whether gates 126 are closed, and a livestock identification sensor 136 adapted to determine the identity of the dairy livestock present within milking box 120. At step 616, a waste grate 140 may be positioned within milking box 120.

The method may proceed to step 618 to position a rail 160. Rail 160 may be positioned to extend in a horizontal direction substantially parallel to rear wall 124c. For example, the horizontal direction may refer to the z-axis illustrated in FIG. 3. In certain embodiments, rail 160 may be positioned proximate to rear wall 124c. At step 620, a robotic attacher 150 may be positioned in milking box 120. Robotic attacher may comprise a main arm 152, a supplemental arm 154, including a gripping portion 156, and a vision system 158. In certain embodiments, robotic attacher 150 may be positioned in equipment portion 128 of milking box 120 by suspending main arm 152 from rail 160. Accordingly, main arm 152 may be operable to traverse rail 160 in the horizontal direction. In certain embodiments, one or more guides 162 may be positioned proximate to rail 160. Guides 162 may be adapted to guide the path of hoses and wires connected to robotic attacher 150 to prevent the hoses and wires from interfering with the movement of main arm 152 along rail 160. Supplemental arm 154 may be positioned to facilitate selectively extending supplemental arm 154 between the rear legs of the dairy livestock located within stall portion 122.

The method proceeds to step 622 to position other milking equipment in equipment portion 128 of milking box 120. Other milking equipment may include one or more preparation cups 164, teat cups 168, pumps 170, milk receiver jars 172, and/or milk separation containers 174. The method then ends.

Figure 7A:
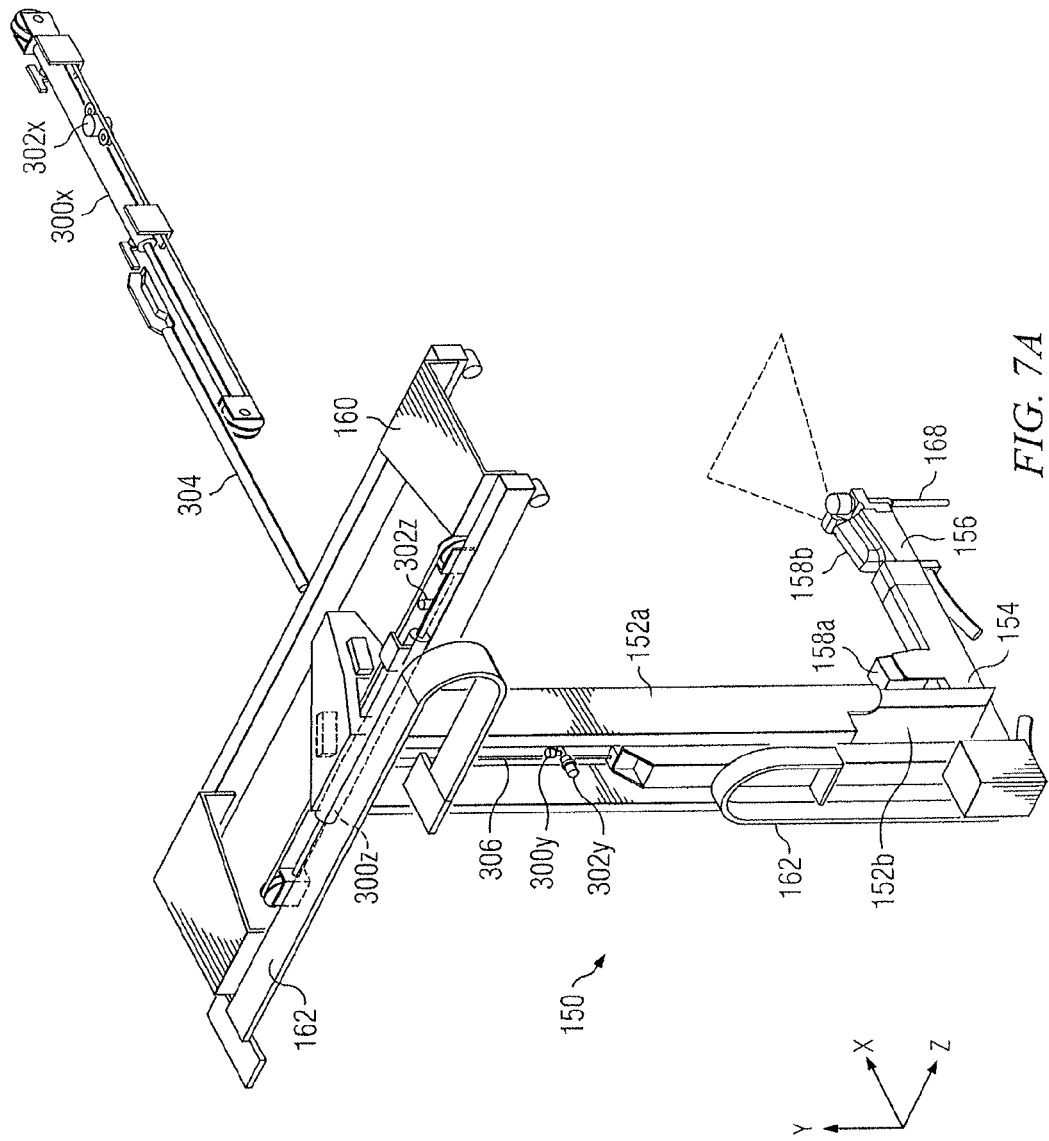
FIG. 7A-7B illustrate an example of an actuator system for facilitating movements of the robotic attacher depicted in FIG. 3, according to certain embodiments of the present disclosure.

FIG. 7A illustrates an example of an actuator system for facilitating movements of robotic attacher 150, according to certain embodiments of the present disclosure. As described with respect to FIG. 3, robotic attacher 150 may include main arm 152 and supplemental arm 154 coupled to main arm 152. Supplemental arm 154 includes a gripping portion 156 operable to grip milking equipment, such as teat cup 168. Main arm 152 may be suspended from rail 160, and guides 162 may support cables connected to robotic attacher 150.

In some embodiments, the actuator system includes a first actuator 300x that facilitates moving main arm 152 in the x-direction, a second actuator 300y that facilitates moving main arm 152 in the y-direction, and a third actuator 300z that facilitates moving main arm 152 in the z-direction. Supplemental arm 154 may provide further translation in the z-direction, for example, using a pivot system such as that described with respect to FIGS. 8A-8D below.

Actuators 300 may comprise any suitable type of actuator. As an example, each actuator 300 may comprise a hydraulic cylinder. Use of a hydraulic cylinder may allow robotic attacher 150 to substantially maintain its position in the event that the dairy cow accidently bumps into robotic attacher 150.

Each actuator 300 may receive signals from controller 200 for positioning main arm 152. Controller 200 may determine the current position of robotic attacher 150 and communicate signals instructing robotic attacher 150 to move from the current position to a desired position. As an example, during a teat cup attachment sequence, the current position may configure main arm 152 such that gripping portion 156 of robotic attacher 150 is located within equipment portion 128 of milking box 120. The desired position may configure main arm 152 in the x-, y-, and/or z-direction such that gripping portion 156 of robotic attacher 150 is located proximate to reference point 178. Controller 200 may determine the current position of main arm 152 based on information received from encoders 302. For example, encoder 302x may correspond to actuator 300x and may track an x-measurement of movement, encoder 302y may correspond to actuator 300y and may track a y-measurement of movement, and encoder 302z may correspond to actuator 300z and may track a z-measurement of movement.

In some embodiments, each encoder 302 comprises a rotary encoder having any suitable number of counts per rotation, such as at least 600 counts per rotation. Encoder 302 adjusts the count in response to detecting movements associated with its corresponding actuator 300. If the count exceeds a threshold, encoder 302 communicates a signal to controller 200 with a measurement indicating the amount of rotation (e.g., the number of counts). Controller 200 may use the amount of rotation of encoder 302 to determine a corresponding amount of linear movement of robotic attacher 150. In some embodiments, controller 200 determines the amount of linear movement according to calibration information. As an example, calibration information may indicate a measurement of linear movement by main arm 152 in the x-direction that corresponds to a rotation (or a fraction of a rotation) of encoder 302x. Similarly, calibration information may be used to calibrate encoders 302y and 302z.

In addition to determining the current position of main arm 152, controller 200 may be operable to determine the current position of supplemental arm 154. In some embodiments, controller 200 determines the current position of supplemental arm 154 (or components of supplemental arm 154) based on the current position of main arm 152 and calibration information. As an example, in some embodiments the calibration information may indicate the x-axis distance "d" between a first point corresponding to main arm 152's point of attachment to supplemental arm 154 and a second point corresponding to gripping claws 340 of supplemental arm 154. Accordingly, if controller 200 determines that the first point (main arm 152) is located at position x with respect to the x-direction, controller 200 may further determine that the second point (gripping claws 340) is located at position (x+d) with respect to the x-direction.

Figure 7B:
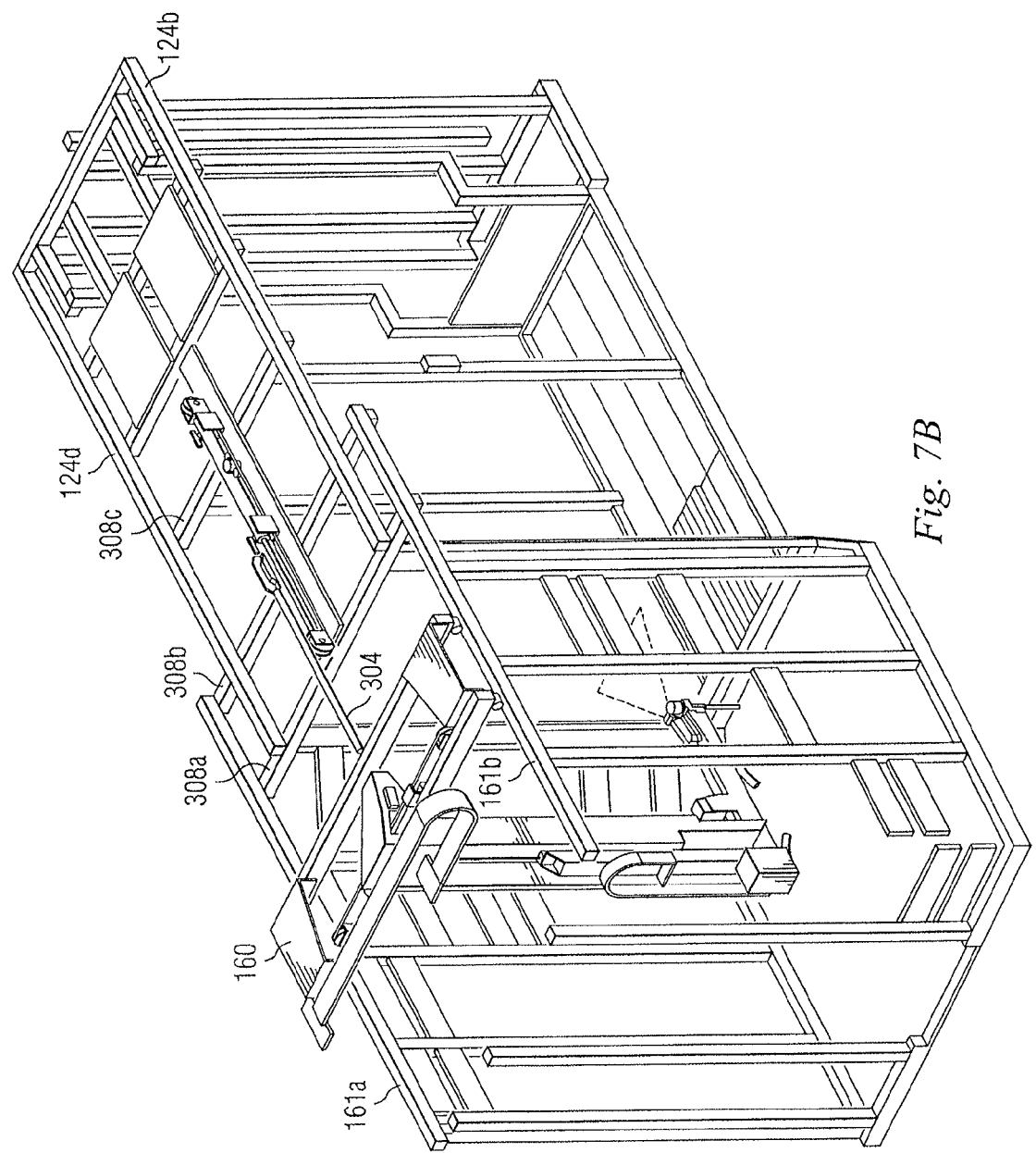

Actuators 300 may be positioned in any suitable location. In some embodiments, actuator 300x may be coupled to an x-bar assembly 304 positioned in a top portion of milking box 120. X-bar assembly 304 may provide structural support to actuator 300x and/or may facilitate translating movements of actuator 300x to main arm 152. As illustrated in FIG. 7B, x-bar assembly 304 may be oriented in the x-direction and coupled to one or more support beams 308 extending between the top of sidewall 124b and the top of sidewall 124d.

In some embodiments, one end of x-bar assembly 304 may be coupled to rail 160 that suspends main arm 152. Rail 160 may be oriented in the z-direction and may extend between support tracks 161a,b that define the top of the sidewalls of equipment portion 128. When x-bar assembly 304 extends, rail 160 may be pushed along support tracks 161 toward the rear of equipment portion 128, thereby causing main arm 152 suspended from rail 160 to move backward. When x-bar assembly 304 retracts, rail 160 may be pulled along support tracks 161 toward the front of equipment portion 128, thereby causing main arm 152 suspended from rail 160 to move forward.

Returning to FIG. 7A, actuator 300y may facilitate moving main arm 152 in the y-direction. In some embodiments, main arm 152 includes a frame portion 152a and an extendable portion 152b. Frame portion 152a may be coupled to rail 160 and to extendable portion 152b. Extendable portion 152b may be coupled to supplemental arm 154 of robotic attacher 150. A y-cable 306 may traverse frame portion 152a in the y-direction, and y-cable 306 may be coupled to extendable portion 152b. Actuator 300y may retract and extend y-cable 306 to facilitate moving extendable portion 152b up and down along frame 152a.

Actuator 300z may be coupled to rail 160 that suspends main arm 152 within equipment portion 128 located in a rear portion of milking box 120. As described above, rail 160 may be oriented in the z-direction and may extend between support tracks 161 that define the top of the sidewalls of equipment portion 128. Actuator 300z may be coupled to any belt, cable, rod, etc. suitable to facilitate translating movements of actuator 300z in the z-direction to main arm 152.

In some embodiments, the actuator system may further include actuators for pivoting gripping portion 156 of supplemental arm 154 in the z-direction. Pivoting gripping portion 156 may extend the range of z-motion of robotic attacher 150 in a manner that minimizes the likelihood of robotic attacher 150 bumping the hind legs of the dairy cow as it navigates beneath the dairy cow. FIGS. 8A-8D illustrate an example of a pivot system 310 for robotic attacher 150, according to certain embodiments of the present disclosure. As illustrated in FIG. 8A, pivot system 310 may be positioned at an end of supplemental arm 154 opposite gripping portion 156.

Figure 8B:
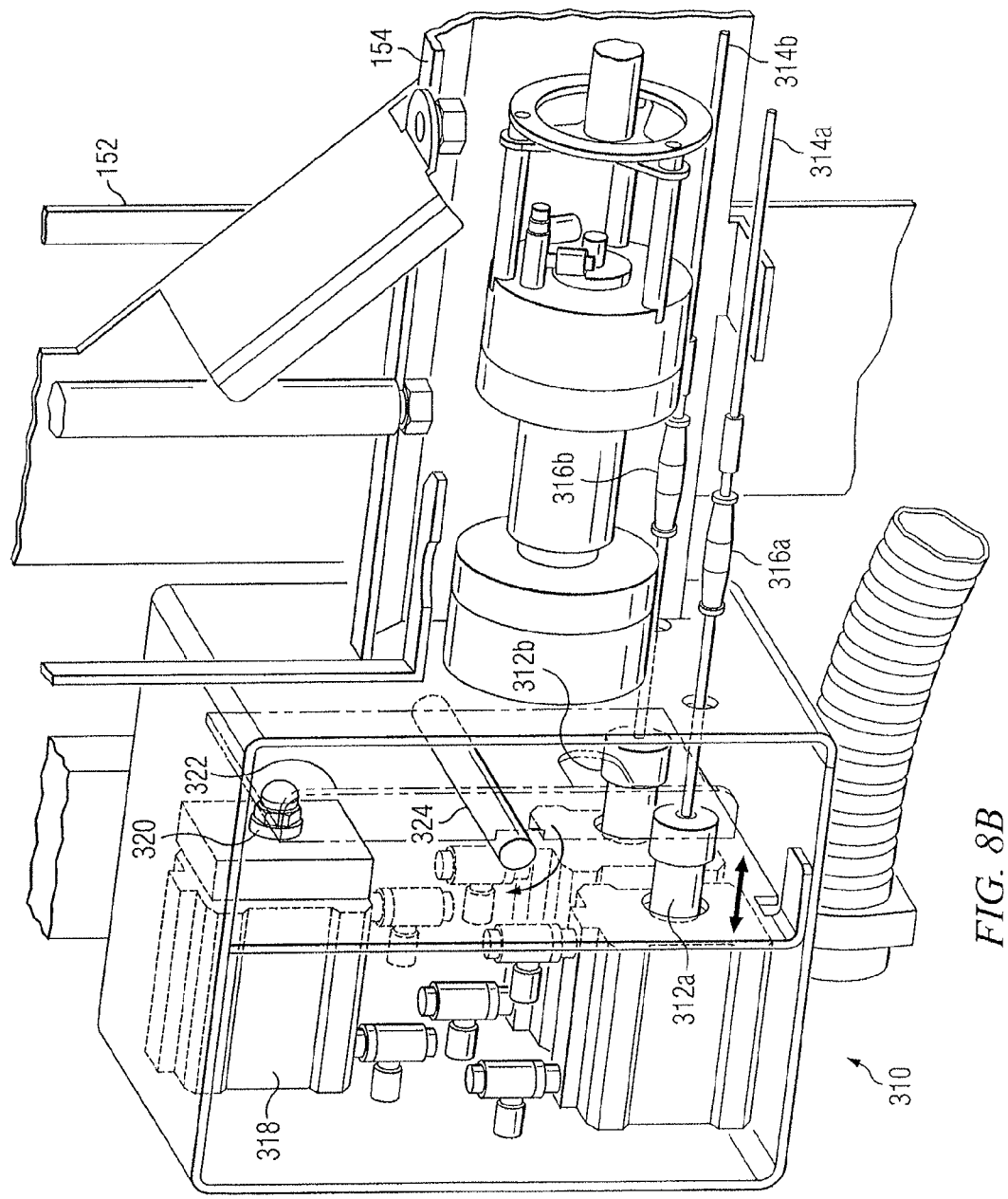

FIG. 8B illustrates an example of components that may make up pivot system 310. In the example, pivot system 310 includes actuators 312a and 312b. Actuator 312a retracts a cable 314a coupled to the right side of gripping portion 156 to pivot gripping portion to the right, and actuator 312b retracts a cable 314b coupled to the left side of gripping portion 156 to pivot gripping portion 156 to the left. In some embodiments, actuators 312 comprise pneumatic cylinders or other suitable actuators and cables 314 comprise steel cables or other suitable cables.

Figure 8C:
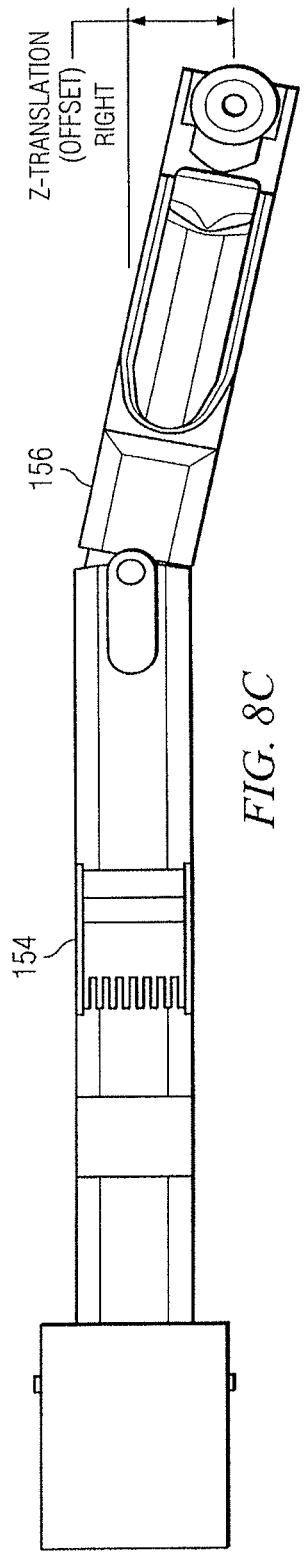
Figure 8D:
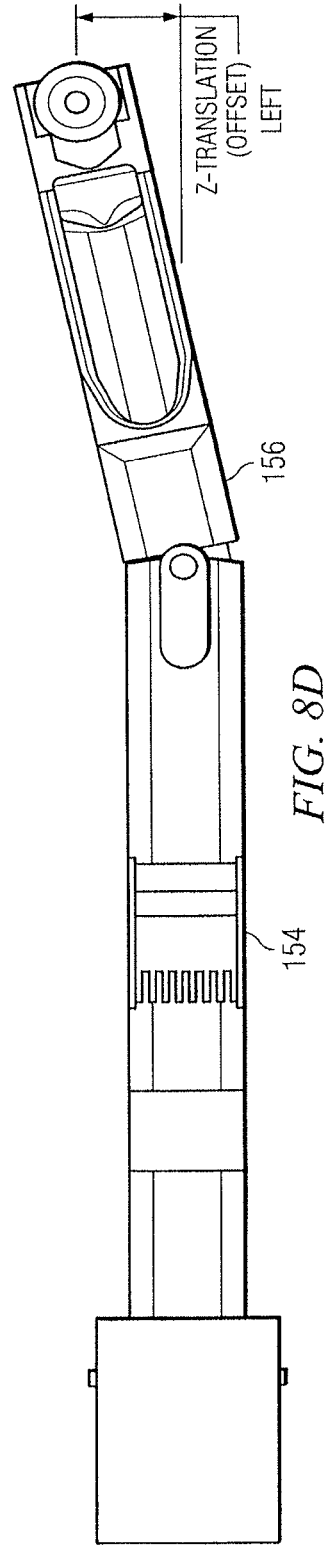

Actuators 312 may extend and retract cables 314 in response to signals communicated by controller 200. In some embodiments, controller 200 may instruct pivot system 310 to pivot gripping portion 156 into one of three positions: a maximum-right position, a centered position, or a maximum-left position. Controller 200 may maintain calibration information corresponding to the maximum-left and maximum-right positions in memory modules 240. As an example, calibration information may indicate a first z-offset between the centered position and the maximum-right position, as illustrated in FIG. 8C, and a second z-offset between the centered position and the maximum-left position, as illustrated in FIG. 8D. Controller 200 may use the z-offset to determine a current position of gripping portion 156. In addition, controller 200 may use the z-offset to determine when to instruct actuators 312 to pivot gripping portion 156. For example, controller 200 may instruct actuator 312a to pivot gripping portion 156 upon a determination that a teat of the dairy cow is located the z-offset distance to the right of gripping portion 156.

Returning to FIG. 8B, in some embodiments, adjusting nuts 316a and 316b may be coupled to cables 314a and 314b, respectively. Making an adjustment to nut 316a may cause the maximum-right position to increase or decrease depending on whether nut 316a is tightened or loosened. Similarly, making an adjustment to nut 316b may cause the maximum-left position to increase or decrease. Calibration information maintained by controller 200 may be updated based on the adjustments.

In order to center gripping portion 156, pivot system 310 may evenly retract cables 314a and 314b by releasing pressure from both actuator 312a and actuator 312b. In addition, pivot system 310 may include a centering assembly to facilitate evenly retracting cable 314a and cable 314b. In some embodiments, the centering assembly includes a centering actuator 318, a centering nut 320, a pivot plate 322, and a pivot bar 324. Centering cylinder 318 may comprise a pneumatic cylinder generally positioned within the top portion of pivot system 310's housing. Pivot plate 322 may extend between centering cylinder 318 and pivot actuators 312a,b. Pivot plate 322 may comprise a substantially flat surface and may include any suitable apertures or cut out portions, for example, to accommodate components of pivot system 310. As an example, pivot plate 322 may include a first aperture through which cable 314a is threaded and a second aperture through which cable 314b is threaded. Pivot bar 324 may be positioned in between the top and bottom (e.g., approximately in the middle) of the housing.

To center gripping portion 156, centering actuator 318 extends centering nut 320 toward pivot plate 322 such that centering nut 320 pushes the top portion of pivot plate 322 outward. As the top portion of pivot plate 322 moves outward, pivot bar 324 provides a fulcrum about which pivot plate 322 pivots such that the bottom portion of pivot plate 322 moves inward. As the bottom portion of pivot plate 322 moves inward, it applies pressure evenly to pivot actuators 312a and 312b aligned side-by-side within the bottom portion of pivot system 310's housing. The pressure applied to actuators 312a,b causes them to evenly retract their respective cables 314a and 314b. To maintain gripping portion 156 in the centered position, centering actuator 318 may apply constant air pressure to centering nut 320.

Returning to FIG. 8A, in certain embodiments, robotic attacher 150 may include a rotating assembly 328 for rotating gripping portion 156 of supplemental arm 154. Rotating assembly 328 may be positioned within a fixed portion 155 of supplemental bar 154. Fixed portion 155 may comprise a non-rotating portion of supplemental arm 154 that extends between main arm 152 and gripping portion 156. Rotating assembly 328 may include a rotating bar 330 and a swivel system 332. Rotating bar 330 may extend along an x-axis of fixed portion 155. Rotating bar may be coupled to swivel system 332 at the proximal end and to gripping portion 156 at the distal end such that when swivel system 332 rotates rotating bar 332, gripping portion 156 rotates about the x-axis. Any suitable connector or combination of connectors may couple rotating bar 330 to swivel system 332 and to gripping portion 156.

FIG. 9A illustrates an example of swivel system 332. Swivel system 332 may include a first swivel 334a operable to rotate rotating bar 330 in a first direction and a second swivel 334b operable to rotate rotating bar 330 in a second direction, the second direction opposite the first direction. As an example, first swivel 334a may rotate rotating bar 330 in a clockwise direction and second swivel 334b may rotate rotating bar 330 in a counter-clockwise direction. Each swivel 334 may provide any suitable range of rotation, such as 0 to 360 degrees or 0 to 180 degrees.

In some embodiments, swivels 334 comprise pneumatic swivels. Increasing air pressure to swivel 334a may rotate rotating bar 330 into a first position. As an example, when rotating bar 330 is in the first position, gripping portion 156 may be oriented with camera 158b on top and nozzle 182 on bottom. If gripping portion 156 is gripping one of the teat cups 168, teat cup 168 may be positioned in an upright orientation when rotating bar 330 is in the first position. To maintain rotating bar 330 in the first position, swivel 334a may maintain constant air pressure.

Releasing air pressure to swivel 334a and increasing air pressure to swivel 334b may rotate rotating bar 330 into a second position. In some embodiments, swivel 334b may rotate rotating bar 180 degrees in moving between the first position to the second position. Accordingly, when rotating bar 330 is in the second position, gripping portion 156 may be oriented with camera 158b on bottom and nozzle 182 on top. If gripping portion 156 is gripping one of the teat cups 168, teat cup 168 may be positioned in an upside down orientation when rotating bar 330 is in the second position. To maintain rotating bar 330 in the second position, swivel 334b may maintain constant air pressure.

FIG. 9B illustrates an example of gripping portion 156 rotated in the second position with nozzle(s) 182 on top. In some embodiments, gripping portion 156 may include multiple nozzles 182, such as first nozzle 182a and second nozzle 182b. As described with respect to FIG. 4A, each nozzle 182 may be operable to spray disinfectant. Accordingly, each nozzle 182 may correspond to a chemical hose 183 that connects nozzle 182 to a disinfectant source. In some embodiments, nozzles 182 spray a mist of disinfectant in a substantially conical shape. Rotating gripping portion 156 such that nozzles 182 are on top during the spraying may allow for efficient disinfecting of the dairy cow's teats.

FIGS. 10A-10B illustrate an example of a gripping system of supplemental arm 154's gripping portion 156. The gripping system facilitates gripping milking equipment, such as preparation cup 166 or teat cup 168. In some embodiments, the gripping system includes a gripping cylinder 330, a cylinder arm 332, cylinder pivots 334a and 334b, claw pivots 336a and 336b, claw arms 338a and 338b, and claws 340a and 340b. Gripping cylinder 330 extends cylinder arm 332 to pivot claw arms 338 open (FIG. 10A) and retracts cylinder arm 332 to pivot claw arms closed (FIG. 10B). Opening claw arms 338 may cause claws 340 to release milking equipment, and closing claw arms 338 may cause claws 340 to grip milking equipment.

Cylinder arm 332 may be coupled to first cylinder pivot 334a and second cylinder pivot 334b. Cylinder pivots 334a and 334b may be coupled to claw pivots 336a and 336b, respectively. Claw pivots 336 and 336b may be coupled to claw arms 338a and 338b, respectively. Extending cylinder arm 332 causes the ends of cylinder pivots 334 coupled to cylinder arm 332 to generally move inward such that cylinder arm 332 and cylinder pivots 334 become unaligned and claw pivots 336 (and their respective claw arms 338) move outward. Retracting cylinder arm 332 causes the ends of cylinder pivots 334 coupled to cylinder arm 332 to generally move outward such that cylinder arm 332 and cylinder pivots 334 become substantially aligned and claw pivots 336 (and their respective claw arms 338) move inward.

Gripping cylinder 330 may comprise any suitable cylinder, such as a pneumatic cylinder or a hydraulic cylinder. Gripping cylinder 330 may extend and retract cylinder arm 332 in response to signals from controller 200. As an example, gripping cylinder 330 may include a first nozzle 342a and a second nozzle 342b. Configuring first nozzle 342a as an inlet and second nozzle 342b as an outlet may cause cylinder arm 332 to extend. Applying constant pressure in first nozzle 342a may maintain cylinder arm 332 in an extended position such that claw arms 338 maintain an open position. Configuring first nozzle 342a as an outlet and second nozzle 342b as an inlet may cause cylinder arm 332 to retract. Applying constant pressure in second nozzle 342b may maintain cylinder arm 332 in a retracted position such that claw arms 338 maintain a closed position.

Figure 11A:
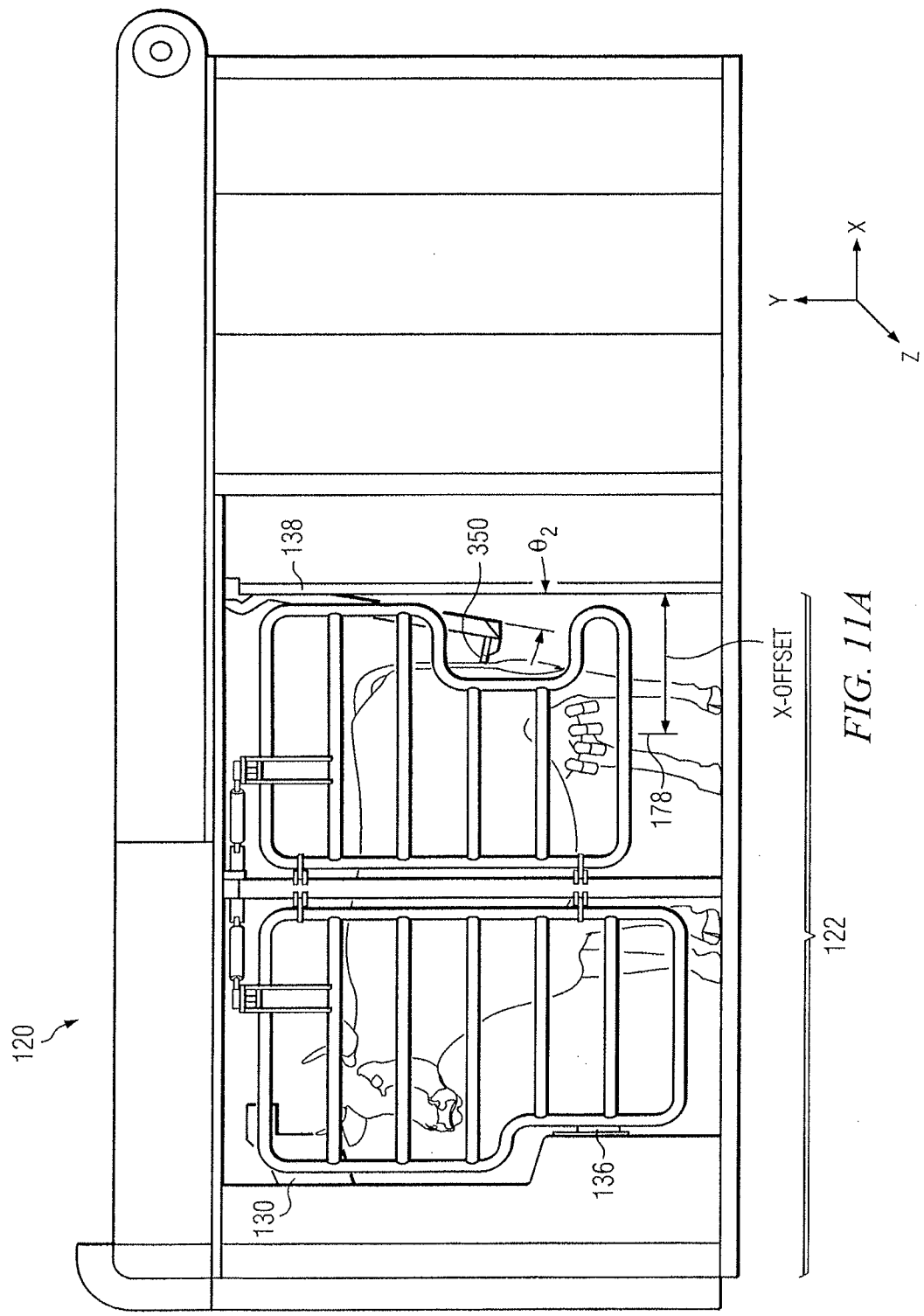

FIG. 11A illustrates an example of feed bowl 130 and backplane 138. As described with respect to FIG. 3, feed bowl 130 and backplane 138 may facilitate positioning a dairy cow toward the rear of milking box 120 in order to attach milking equipment located behind the dairy cow. Feed bowl 130 may be located toward the front of stall portion 122. In some embodiments, backplane 138 may be suspended in the rear of stall portion 122 at an angle of suspension $\theta_2$. As illustrated in FIG. 11A, before dairy cow enters milking box 120, feed bowl 130 may be in a maximum-retracted position and backplane 138's angle of suspension $\theta_2$ may be at a maximum such that a contact surface 350 of backplane 138 extends toward the front of milking box 120. As an example, in some embodiments, the maximum angle of suspension $\theta_2$ may be between approximately 5 to approximately 30 degrees.

As described above, when the dairy cow enters milking box 120, identification sensor 136 may read an RF identifier from the dairy cow's collar tag (or any other suitable identifier) and communicate the identifier to controller 200. Controller 200 may retrieve information associated with dairy cow's identifier from memory module 240. The information may include the type of feed that the dairy cow should eat and the size of the dairy cow. Controller 200 may instruct feed bowl 130 to dispense the type of feed and to move toward a maximum-extended position determined based on the size of the dairy cow. Accordingly, the maximum-extended position selected for a smaller cow may place feed bowl 130 closer to the rear of stall portion 122 than the maximum-extended position selected for a larger cow.

As feed bowl 130 extends toward the dairy cow, the dairy cow may back toward backplane 138 and eventually make contact with contact surface 350 of backplane 138. In response to pressure applied to contact surface 350, backplane 138 may move toward the rear of milking box 120. As illustrated in FIG. 11B, moving backplane 138 toward the rear of milking box 120 may cause the angle of suspension $\theta_2$ to decrease.

Figure 11C:
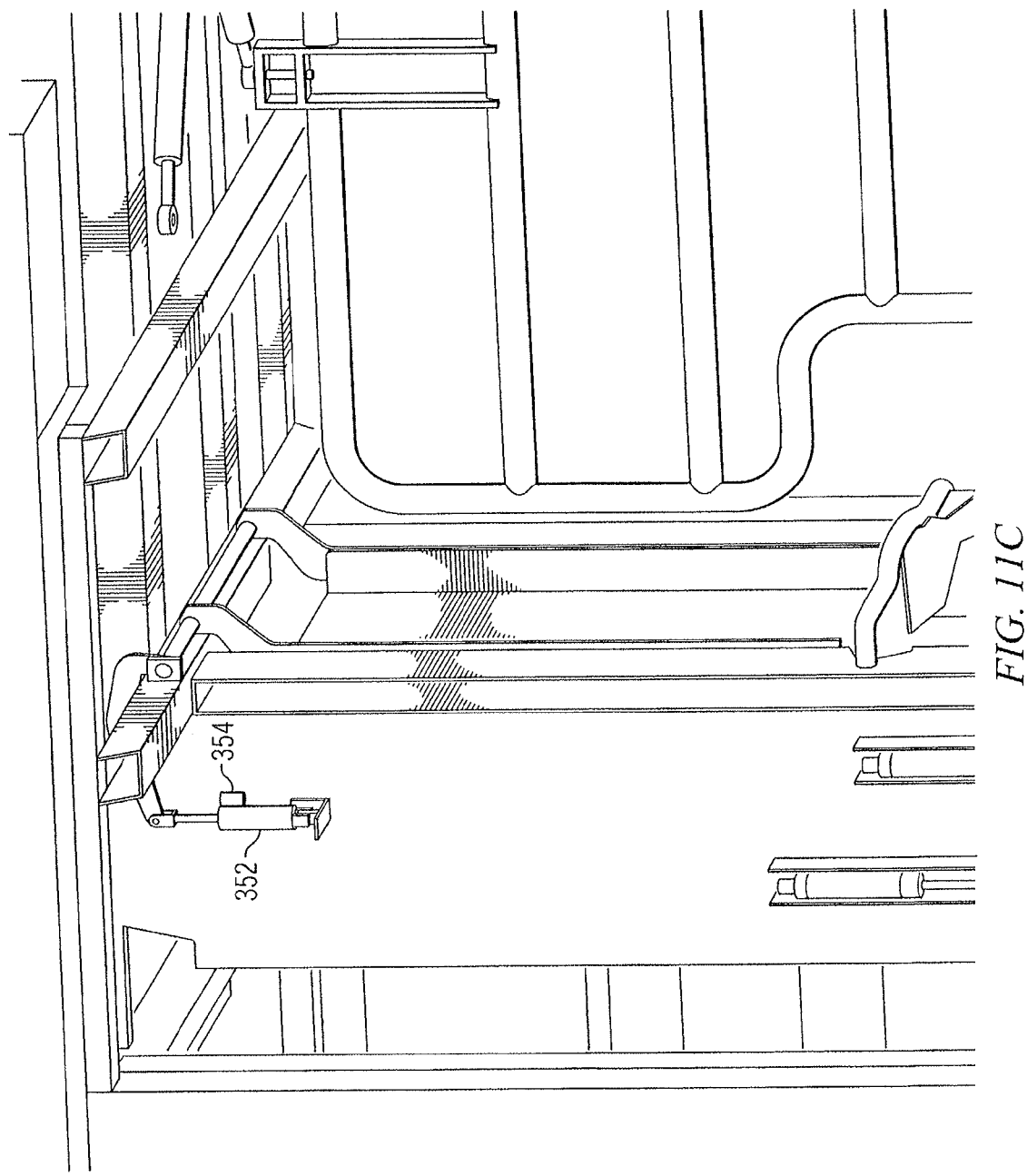

Controller 200 may track the position of backplane 138 as backplane 138 moves toward the rear of milking box 120. For example, FIG. 11C illustrates an embodiment in which backplane 138 is coupled to an actuator 352, such as a pneumatic cylinder. The length of the cylinder may correspond to backplane 138's current angle of suspension $\theta_2$. Actuator 352 may be associated with an encoder 354 that communicates signals to controller 200 indicating the length of the cylinder. Controller 200 may use the length of the cylinder and calibration information to determine the position of backplane 138. If controller 200 determines that the dairy cow has moved a sufficient distance toward the rear of milking box 120 (e.g., based on the position of backplane 138), controller 200 may communicate a signal instructing feed bowl 130 to stop moving toward the dairy cow.

In some embodiments, actuator 352 may apply a substantially constant pressure to extend backplane 138 toward the front of milking box 120. Actuator 352 applies pressure low enough to yield to the dairy cow such that the angle of suspension $\theta_2$ decreases when the dairy cow backs into contact surface 350. Actuator 352 applies pressure high enough to extend backplane 138 toward the front of milking box 120 (e.g., increase the angle of suspension $\theta_2$) when pressure is removed from contact surface 350. Thus, if the dairy cow moves slightly forward, contact surface 350 of backplane 138 maintains contact with the rear of the dairy cow. If the dairy cow exits milking box 120, the pressure applied by actuator 352 causes backplane to extend to the default position (e.g., maximum angle of suspension $\theta_2$).

Controller 200 may communicate signals to position robotic attacher 150 based on the position of backplane 138. For example, controller 200 may determine an x-offset based at least in part on the position of backplane 138. The x-offset may indicate how far forward to extend supplemental arm 154 in the x-direction in order to reach the teats of the dairy cow. Thus, the x-offset may increase as the angle of suspension $\theta_2$ increases (indicating the dairy cow has moved toward the front of milking box 120). The x-offset may decrease as the angle of suspension $\theta_2$ decreases (indicating the dairy cow has moved toward the rear of milking box 120). In some embodiments, controller 200 may use additional information to determine the x-offset, such as the relative positions of the teats of the particular dairy cow, which may be determined from stored information associated with the dairy cow's identifier.

Figure 11D:
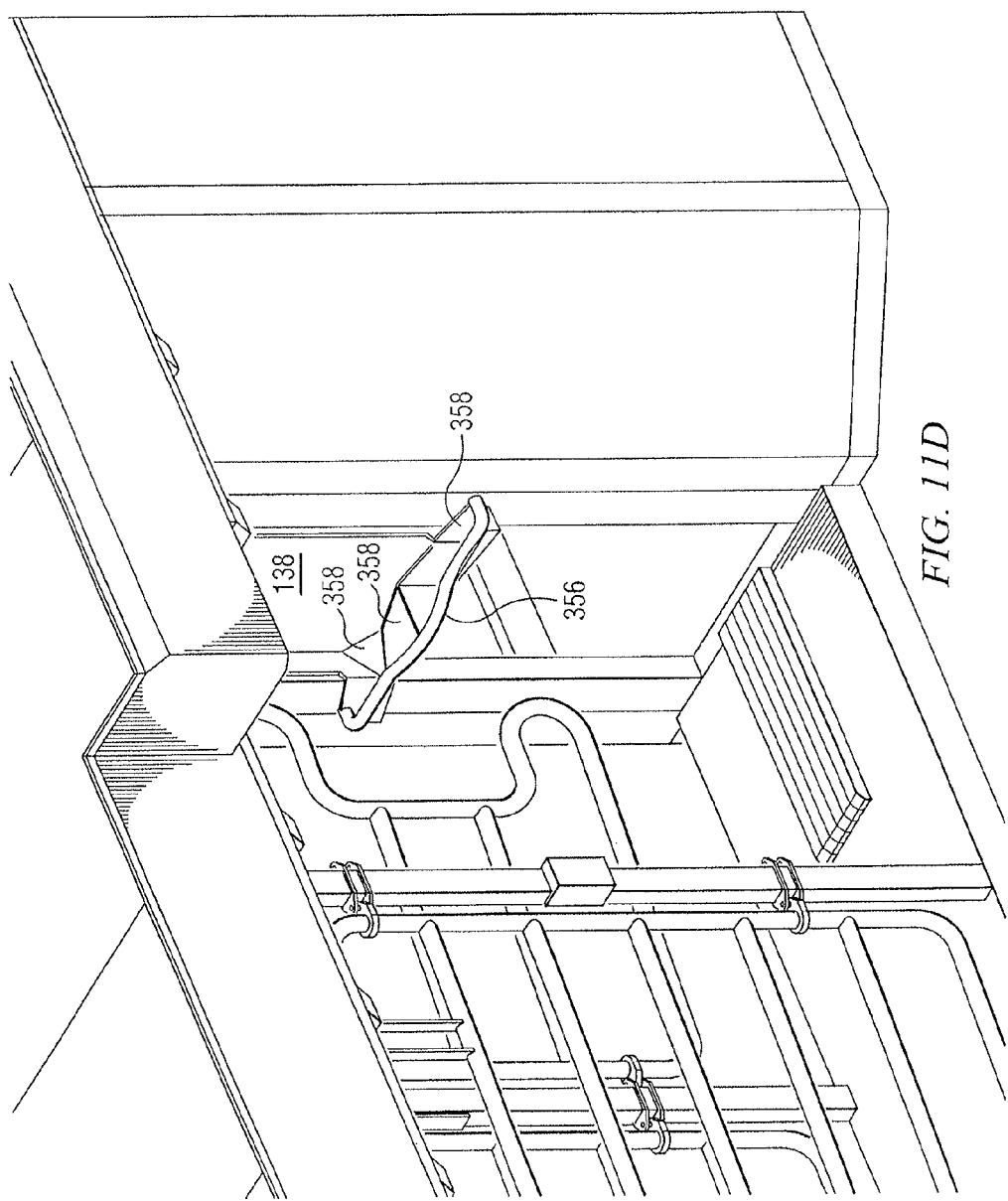

FIG. 11D illustrates a perspective view of backplane 138, according to certain embodiments. Backplane 138 includes a manure gutter 356. Manure gutter 356 may include one or more guide plates 358. The guide plates may generally be angled downward toward an outlet that guides manure and other waste toward a waste area. The waste area may be located outside of milking box 120 and proximate to one of the sidewalls 124b or 124d (e.g., away from the milking equipment in equipment portion 128). In some embodiments, manure gutter 356 includes a flushing system for washing away the waste.

Figure 12A:
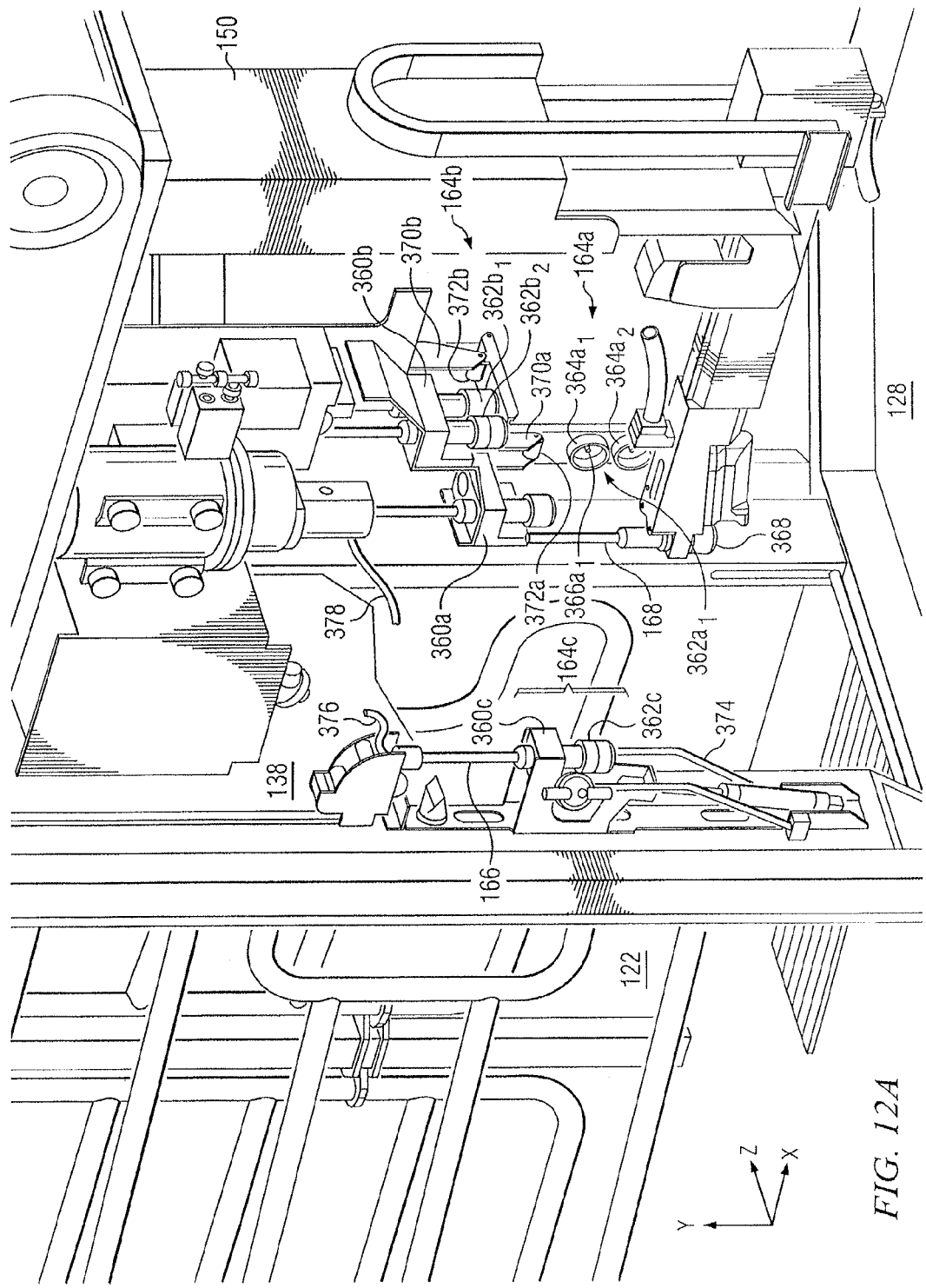
FIGS. 12A-12B illustrate examples of areas for storing cups within the milking box depicted in FIG. 3, according to certain embodiments of the present disclosure.
Figure 12B:
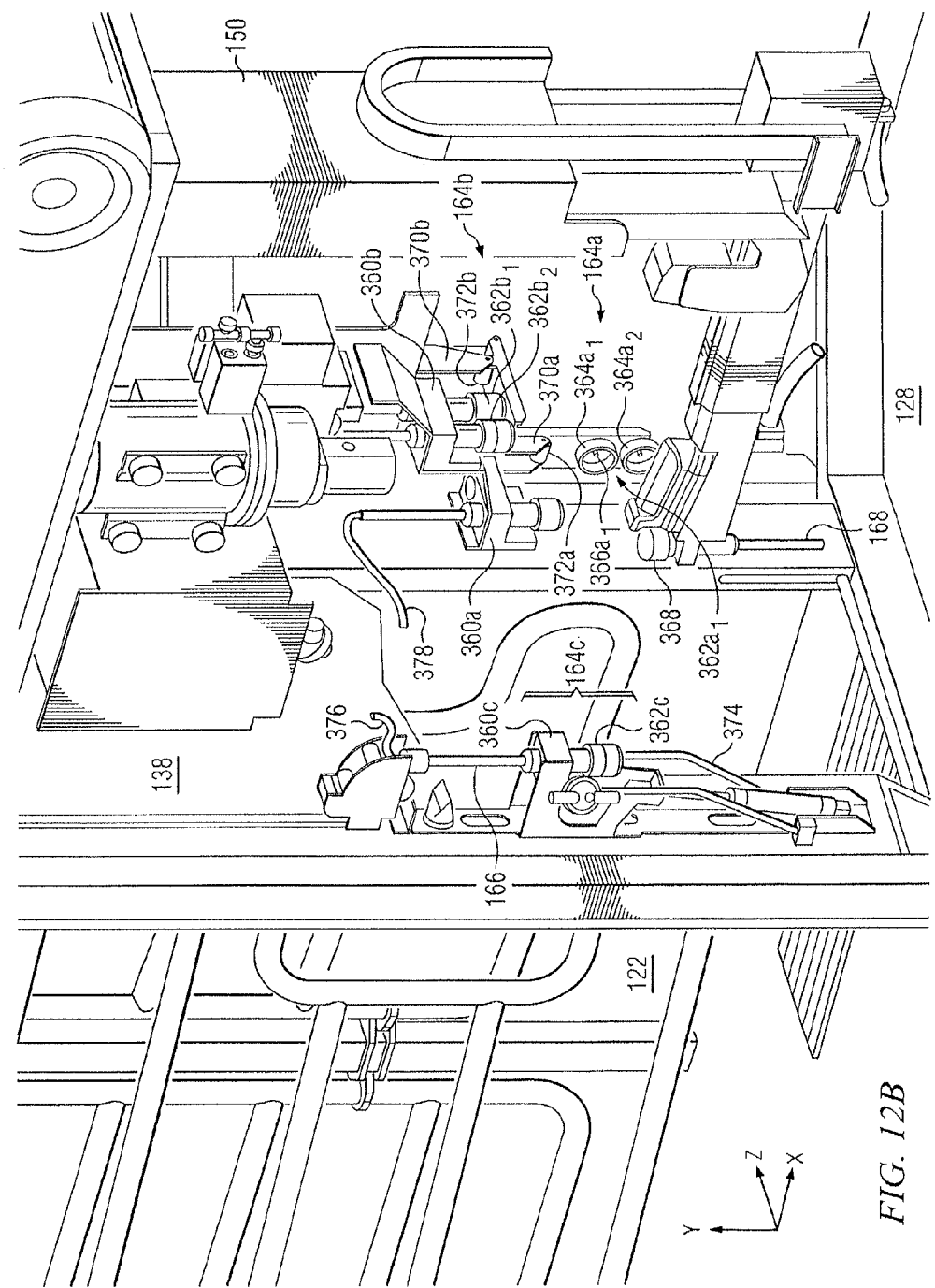

FIGS. 12A-12B illustrate an example of storage areas 164 within equipment portion 128 of milking box 120. As described above, during the time between milking cycles, extendable/retractable hoses may suspend preparation cup(s) 166 and teat cup(s) 168 within their corresponding storage areas 164. Each storage area 164 may include a cup holder base 360 and one or more cup holders 362. Cup holder base 360 may include one or more apertures, each aperture adapted to hold the base of a cup (e.g., preparation cup 166 or teat cup 168). Each cup holder 362 may correspond to one of the cups and may include a rimmed structure 364 adapted to hold the attachment end 368 of the cup within rimmed structure 364. Cup holder 362 may also include a nozzle 366 that substantially aligns with an opening of the cup stored in cup holder 362. Nozzle 366 may be coupled to a cleansing hose and may facilitate backwashing the cup, as further described in FIG. 14A below.

In some embodiments, one or more cup holders 362 may be coupled to a cup holder bracket 370. As an example, equipment portion 128 may include a first cup holder bracket 370a comprising two teat cup holders $362a_1$, $362a_2$ and a second cup holder bracket 370b comprising two teat cup holders $362b_1$, $362b_2$. In some embodiments, first cup holder bracket 370a may be positioned toward the front of equipment portion 128 in the x-direction (e.g., proximate to stall portion 122) and in a middle part of equipment portion 128 in the z-direction. First cup holder bracket 370a may hold the teat cups 168 to be attached to the front teats of the dairy cow. Second cup holder bracket 370b may be positioned behind first cup holder bracket 370a. Second cup holder bracket 370b may hold the teat cups 168 to be attached to the rear teats of the dairy cow.

Cup holder bracket 370 may open to facilitate retrieval of teat cup 168 by robotic attacher 150 and close to store teat cup 168. For example, cup holder bracket 370 may include a hinge 372 that allows cup holder bracket 370 to move between opened and closed positions in response to signals from controller 200. FIG. 12A illustrates an example in which first cup holder bracket 370a is opened and second cup holder bracket 370b is closed. The open cup holder bracket 370a may have a substantially vertical orientation with teat cups 168 released from teat cup holders $362a_1$, $362a_2$. The closed cup holder bracket 370b may have a substantially horizontal orientation with each teat cup holder $362b_1$, $362b_2$ aligned such that rimmed structure 364 holds a corresponding teat cup 168.

In some embodiments, preparation cup holder 362c may be coupled to a movable arm 374 that facilitates opening and closing preparation cup holder 362c. FIG. 12A illustrates an example of preparation cup holder 362c in a closed position.

Each preparation cup 166 may be stored in storage area 164 in an upside down orientation, suspended from an extendable/retractable preparation hose 376. Similarly, each teat cup 168 may be stored in storage area 164 in an upside down orientation, suspended from an extendable/retractable milking hose 378. To retrieve a cup, gripping portion 156 of robotic attacher 150 may be oriented with camera 158b on bottom and nozzle 182 on top. FIG. 12A illustrates an example of retrieving teat cup 168 from storage area 164. After retrieving teat cup 168, robotic attacher 150 may rotate gripping portion 156 such that camera 158b is on top, nozzle 182 is on bottom, and teat cup 168 has an upright orientation, as illustrated in FIG. 12B.

Robotic attacher 150 may move the teat cup 168 from a first location, such as storage area 164, to a second location, such as the teat of the dairy cow. In some embodiments, teat cup 168 may be returned to the first location without requiring robotic attacher 150 to pick up teat cup 168. For example, after robotic attacher 150 releases teat cup 168, a hose lift assembly may retract milking hose 378.

Figure 13:
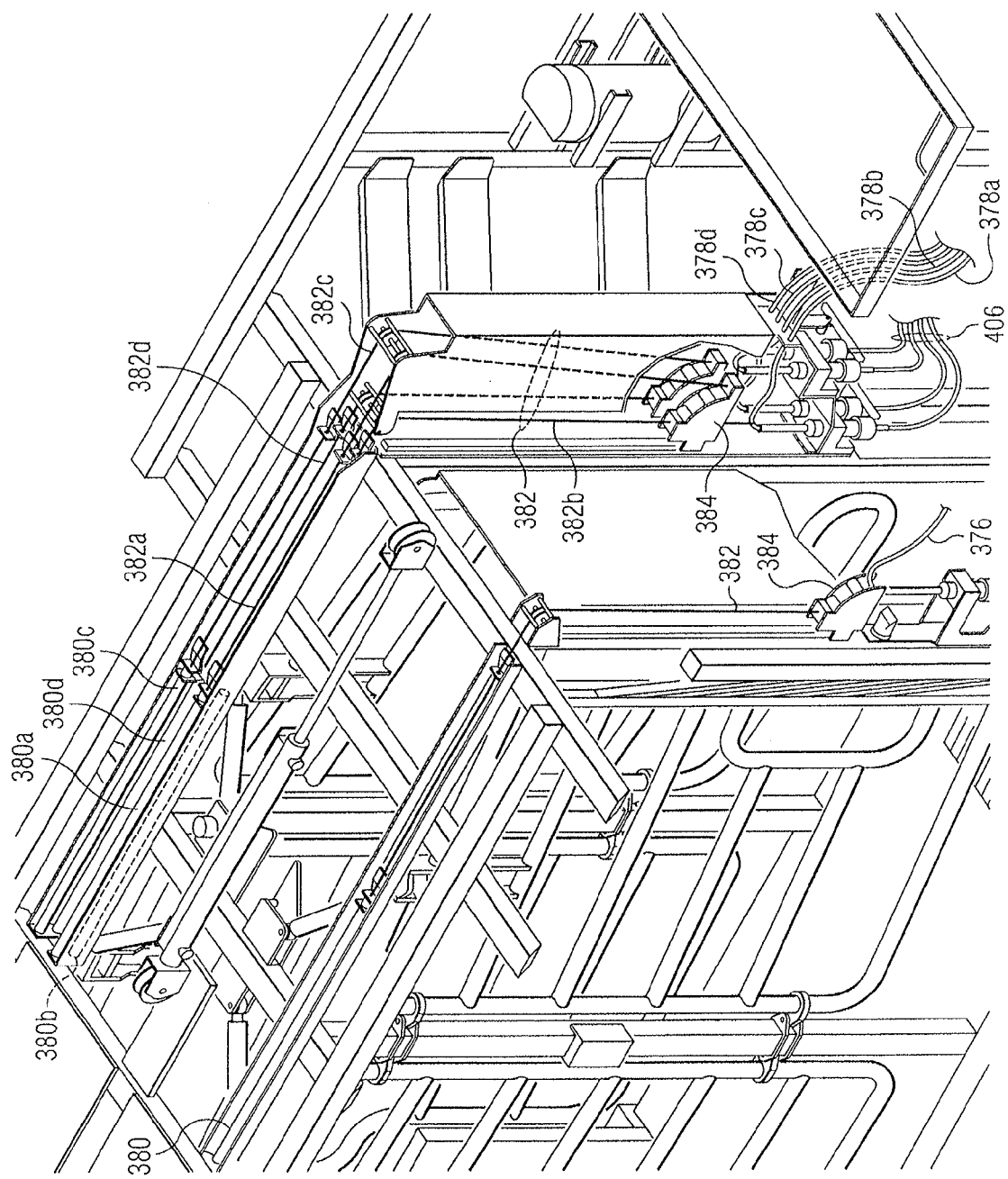
FIG. 13 illustrates an example of a hose lift assembly within the milking box depicted in FIG. 3, according to certain embodiments of the present disclosure.

FIG. 13 illustrates an example of a hose lift assembly comprising an actuator 380, one or more belts 382, and one or more rollers 384. Actuator 380 may retract belt(s) 382 coupled to milking hose 378 in response to a signal from controller 200. For example, controller may determine to release teat cup 168 from the teat and retract milking hose 378 corresponding to teat cup 168 when the milk flow rate from the teat falls below a threshold. Belt(s) 382 and/or hose 378 may be guided by rollers 384 as hose 378 is pulled into a retracted position for storage. In some embodiments, actuator 380 comprises a pneumatic cylinder positioned above stall portion 122 and oriented in the x-direction. In some embodiments, milking box 120 includes five hose lift assemblies, one assembly for retracting milking hoses 378*a-d* coupled to each of four teat cups 168 and one assembly for retracting preparation hose 376 coupled to preparation cup 166.

Figure 14A:
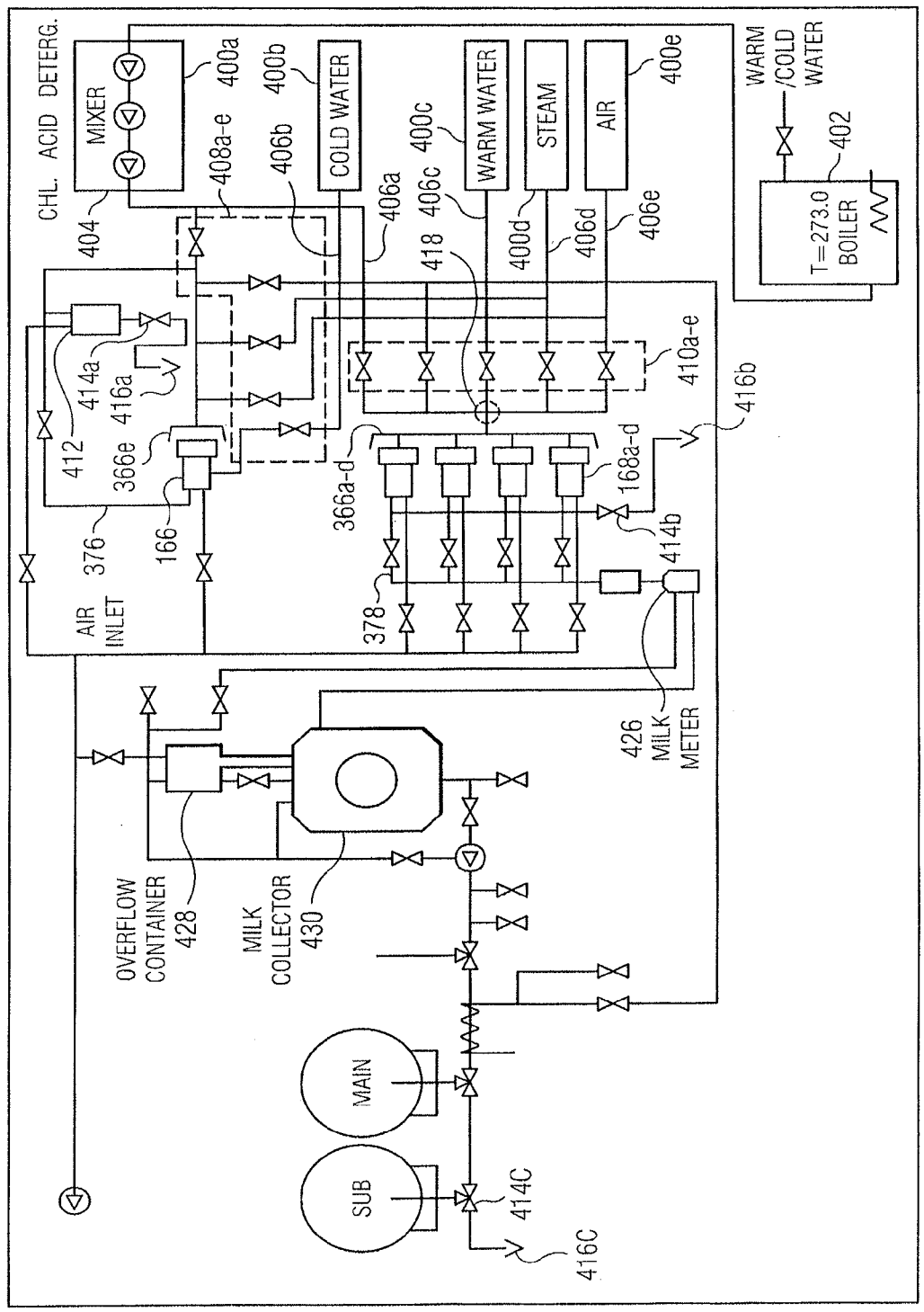
FIGS. 14A-14B illustrate an example of a cleansing system for cleaning milking equipment associated with the milking box depicted in FIG. 3, according to certain embodiments of the present disclosure.

FIG. 14A illustrates an example of cleansing system for cleaning milking equipment associated with milking box 120. As described with respect to FIG. 12A, the cleansing system may inject a cleanser through nozzle 366 of cup holder 362 in order to backwash a cup (e.g., preparation cup 166 or teat cup 168) and equipment connected between the cup and an open drain.

The cleansing system may include a plurality of cleanser sources 400, such as a detergent source 400*a*, a cold water source 400*b*, a warm water source 400*c*, a steam source 400*d*, and an air source 400*e*. Detergent source 400*a* may include a mixer 404 that receives hot water from a boiler 402 and mixes the hot water with one or more chemicals, such as chlorine, concentrated detergent, and/or other chemicals.

A cleansing hose system connects cleanser sources 400 to nozzles 366. Cleansing hose system may comprise one or more of cleansing hoses 406, preparation system valves 408, milk collecting system valves 410, and connectors 418. In some embodiments, each cleanser source 400 corresponds to one preparation system valve 408 and one milk collecting system valve 410. When preparation system valve 408 opens, cleanser source 400 dispenses cleanser through the cleansing hose system to nozzle 366 aligned with an opening of preparation cup 166 in order to backwash at least a portion of the preparation system. When the milk collecting system valve 410 opens, cleanser source 400 dispenses cleanser through the cleansing hose system to nozzle 366 aligned with an opening of teat cup 168 in order to backwash at least a portion of the milk collecting system. The valve system (e.g., valves 408 and 410) facilitates cleansing the preparation system and the milk collecting system independently of one another.

The cleansing system may cleanse preparation cup 166 in response to signals communicated by controller 200. In some embodiments, controller 200 initiates cleansing preparation cup 166 based on a pre-determined time interval and/or upon a determination that a preparation cycle has completed. Controller 200 may determine that a preparation cycle has completed based on any suitable indicator, such as an indicator that preparation cup 166 has been returned to preparation cup holder 362*c* or an indicator that a milking cycle has completed (and therefore, the preparation cycle preceding the milking cycle has also completed).

To cleanse preparation cup 166, controller 200 selects a cleanser source 400 (e.g., detergent, cold water, warm water, steam, and/or air) and communicates instructions to open preparation system valve 408 corresponding to the selected cleanser source 400. Cleanser may then flow from the cleanser source 400 through cleansing hoses 406 and cup holder nozzle 366*e*. Nozzle 366*e* may inject the cleanser into preparation cup 166 in order to backwash preparation cup 166 and equipment connected between preparation cup 166 and an open drain 416*a*. For example, the cleanser may backwash a pre-milk container 412 and preparation hoses 376 connected between preparation cup 166 and pre-milk container 412. Controller 200 may communicate instructions to open a drain valve 414*a* corresponding to drain 416*a* of pre-milk container 412 in order to dispose of the cleanser. In some embodiments, controller 200 communicates instructions to close preparation system valve 408 and drain valve 414*a* after a pre-determined amount of cleansing time.

The cleansing system may cleanse teat cups 168 in response to signals communicated by controller 200. In some embodiments, controller 200 initiates cleansing teat cups 168 based on a pre-determined time interval and/or upon a determination that a milking cycle has completed. Controller 200 selects a cleanser source 400 (e.g., detergent, cold water, warm water, steam, and/or air) and communicates instructions to open milk collecting system valve 410 corresponding to the selected cleanser source 400. Cleanser may then flow from the cleanser source 400 through cleansing hoses 406 and connector 418.

Figure 14B:
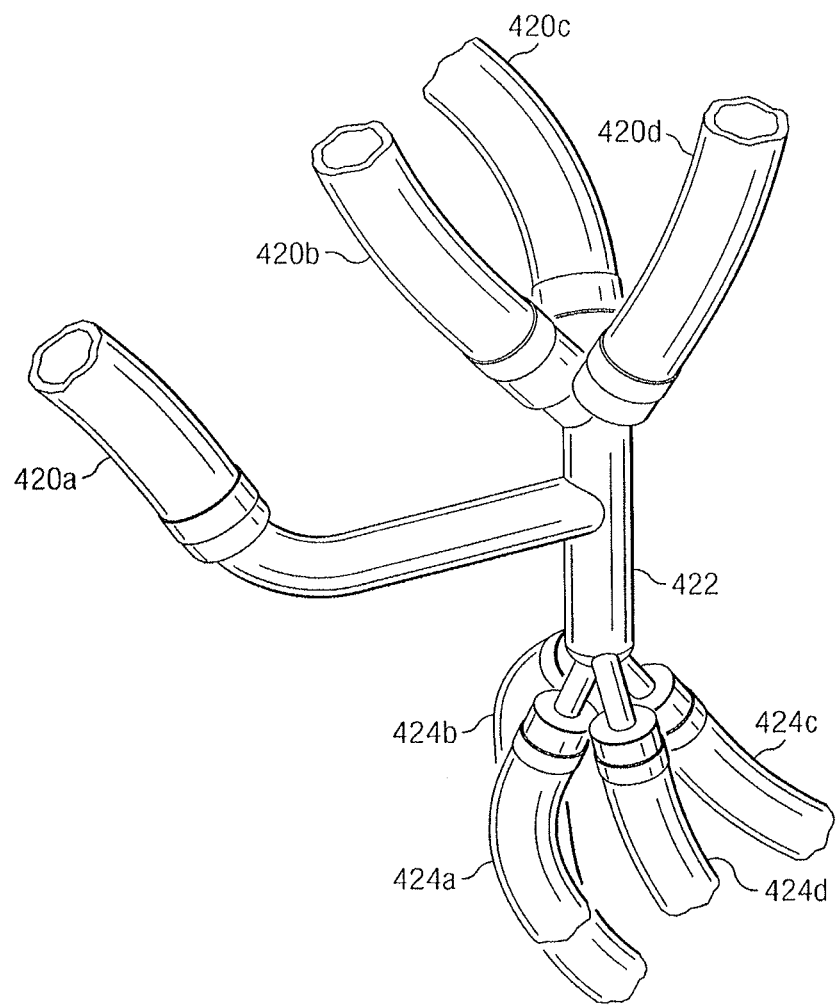

FIG. 14B illustrates an example of connector 418. In some embodiments, connector 418 includes a plurality of inlets 420, a connecting portion 422, and a plurality of outlets 424. Each inlet 420 may correspond to one of the cleanser sources 400. For example, a first inlet 420*a* may correspond to detergent source 400*a*, a second inlet 420*b* may correspond to cold water source 400*b*, a third inlet 420*c* may correspond to warm water source 400*c*, a fourth inlet 400*d* may correspond to steam source 400*d*, and/or a fifth inlet 400*e* may correspond to air source 400*e*. Connecting portion 422 connects inlets 400*a-e* to a single chamber. The single chamber splices into the plurality of outlets 424, and each outlet corresponds to one of the nozzles 366*a-d* that injects cleanser into one of the teat cups 168. Thus, connector 418 facilitates injecting a cleanser from one cleanser source 400 into all of the teat cups 168 at substantially the same time.

Returning to FIG. 14A, nozzles 366*a-d* may inject the cleanser into teat cups 168 in order to backwash teat cups 168 and milking equipment connected between teat cups 168 and an open drain 416. In some embodiments, controller 200 communicates instructions to close milk collecting system valve 410 and a drain valve 414 corresponding to the open drain 416 after a pre-determined amount of cleansing time.

In some embodiments, milk collecting system may include multiple drain valves 414 each operable to open and close one of multiple drains 416 positioned at various points within the milk collecting system. Accordingly, controller 200 may initiate different types of cleaning modes, such as a short cleaning and a main cleaning, by selecting which drain valve 414 to open.

As an example, controller 200 may determine to perform a short cleaning upon determining the completion of a milking cycle (e.g., in some embodiments, a short cleaning may be performed each time the milk collecting system finishes milking one of the dairy cows). Controller 200 may select a cleanser to dispense during the short cleaning, such as steam, cold water, and/or warm water. Controller 200 may then communicate signals with instructions to open the milk collecting system valve 410 corresponding to the cleanser source 400 that dispenses the selected cleanser. During the short cleaning procedure, controller 200 may communicate instructions to open a drain valve 414*b* corresponding to a drain 414*b* selected for the short cleaning. As an example, drain 414*b* may be positioned between teat cup 168 and a milk collector 430. Thus, during the short cleaning, the cleanser may backwash teat cup 168 and milking hoses 378 connected between teat cup 168 and drain 414b, but may not clean milk collector 430.

As another example, controller 200 may determine to perform a main cleaning upon determining a pre-determined time interval. The time interval may refer to a time of day, such as 9:00 AM, 1:00 PM, 4:00 PM, or other suitable time. Alternatively, the time interval may refer to an amount of time that has elapsed since the last main cleaning, such as 4 hours, 8 hours, 12 hours, or other suitable time period. In some embodiments, the time interval may be selected to facilitate main cleaning at least twice per day, such as at least three times per day. Controller 200 may select a cleanser to dispense during the main cleaning, such as detergent. Controller 200 may then communicate signals with instructions to open the milk collecting system valve 410 corresponding to the cleanser source 400 that dispenses the selected cleanser. During the main cleaning procedure, controller 200 may communicate instructions to close drain valve 414b and open a drain valve 414c corresponding to a drain 414c selected for the main cleaning. As an example, drain 414c may be positioned after milk collector 430. Thus, during the main cleaning, the cleanser may backwash teat cup 168, milking hoses 378, milk collector 430, and any other equipment positioned between teat cup 168 and drain 414c, such as milk meter 426 and overflow container 428.

Modifications, additions, or omissions may be made to the systems described herein without departing from the scope of the invention. The components may be integrated or separated. Moreover, the operations may be performed by more, fewer, or other components. Additionally, the operations may be performed using any suitable logic comprising software, hardware, and/or other logic. As used in this document, "each" refers to each member of a set or each member of a subset of a set.

Modifications, additions, or omissions may be made to the methods described herein without departing from the scope of the invention. For example, the steps may be combined, modified, or deleted where appropriate, and additional steps may be added. Additionally, the steps may be performed in any suitable order without departing from the scope of the present disclosure.

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A method, comprising:
   retrieving, by a robotic attacher, a first cup from the right side of an equipment area located behind a dairy livestock;
   attaching, by the robotic attacher, the first cup to a right front teat of the dairy livestock;
   retrieving, by the robotic attacher, a second cup from the right side of the equipment area after attaching the first cup;
   attaching, by the robotic attacher, the second cup to a left front teat of the dairy livestock;
   retrieving, by the robotic attacher, a third cup from the right side of the equipment area after attaching the second cup;
   attaching, by the robotic attacher, the third cup to a right rear teat of the dairy livestock;
   retrieving, by the robotic attacher, a fourth cup from the right side of the equipment area after attaching the third cup; and
   attaching, by the robotic attacher, the fourth cup to a left rear teat of the dairy livestock.

2. The method of claim 1, wherein attaching the first cup comprises:
   determining a location of a reference point;
   positioning the teat cup relative to the reference point; and
   determining a location of the right front teat from the reference point.

3. The method of claim 1, wherein each of the first, second, third, and fourth cups comprises a teat cup.

4. The method of claim 1, further comprising:
   retracting the robotic attacher into the equipment area after attaching the fourth cup;
   detaching the cups after the robotic attacher releases grip of the cups; and
   retracting the cups into the equipment area independently of the robotic attacher gripping the cups.

5. A method, comprising:
   retrieving, by a robotic attacher, a preparation cup from the left side of an equipment area located behind a dairy livestock;
   attaching and detaching, by the robotic attacher, the preparation cup to each teat of a dairy livestock in a sequence of right front teat, left front teat, left rear teat, and right rear teat;
   retrieving, by the robotic attacher, a first teat cup from the right side of the equipment area after attaching and detaching the preparation cup;
   attaching, by the robotic attacher, the first teat cup to the right front teat of the dairy livestock;
   retrieving, by the robotic attacher, a second teat cup from the right side of the equipment area after attaching the first teat cup;
   attaching, by the robotic attacher, the second teat cup to the left front teat of the dairy livestock;
   retrieving, by the robotic attacher, a third teat cup from the right side of the equipment area after attaching the second teat cup;
   attaching, by the robotic attacher, the third teat cup to the right rear teat of the dairy livestock;
   retrieving, by the robotic attacher, a fourth teat cup from the right side of the equipment area after attaching the third teat cup; and
   attaching, by the robotic attacher, the fourth teat cup to the left rear teat of the dairy livestock.

* * * * *